(12) United States Patent
Oberg

(10) Patent No.: US 8,902,722 B2
(45) Date of Patent: *Dec. 2, 2014

(54) METHOD AND APPARATUS FOR DETERMINING A LOCATION OF A FEATURE ON A STORAGE MEDIUM

(71) Applicant: Marvell World Trade Ltd., St. Michael (BB)

(72) Inventor: Mats Oberg, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,710

(22) Filed: Dec. 2, 2013

(65) Prior Publication Data

US 2014/0086031 A1 Mar. 27, 2014

Related U.S. Application Data

(63) Continuation of application No. 13/669,218, filed on Nov. 5, 2012, now Pat. No. 8,599,666, which is a continuation of application No. 13/189,111, filed on Jul. 22, 2011, now Pat. No. 8,305,703, which is a continuation of application No. 12/684,659, filed on Jan. 8, 2010, now Pat. No. 7,995,301.

(60) Provisional application No. 61/144,602, filed on Jan. 14, 2009.

(51) Int. Cl.
   *G11B 20/18* (2006.01)
   *G11B 7/09* (2006.01)
(52) U.S. Cl.
   CPC .......... *G11B 7/0948* (2013.01); *G11B 2220/20* (2013.01); *G11B 20/1883* (2013.01)

USPC ...................... 369/53.15; 369/53.2; 369/53.22
(58) Field of Classification Search
   None
   See application file for complete search history.

(56) References Cited

U.S. PATENT DOCUMENTS

| 5,235,585 A | 8/1993 | Bish et al. |
| 5,781,590 A | 7/1998 | Shiokawa et al. |
| 5,982,722 A | 11/1999 | Hashimoto |

(Continued)

FOREIGN PATENT DOCUMENTS

| JP | 5-189764 | 7/1993 |
| JP | 6-243493 | 9/1994 |

(Continued)

OTHER PUBLICATIONS

International Search Report issued in International App. No. PCT/US2010/020518, mailed on Jun. 17, 2010.

(Continued)

*Primary Examiner* — Peter Vincent Agustin

(57) ABSTRACT

A counter is configured to generate counts associated with different locations, within a smallest addressable unit of data, on a storage medium of a disk drive. A detector is configured to detect a change in a property of a signal sensed from the storage medium. A controller is configured to: determine a count of the counter corresponding to a location, within a smallest addressable data unit on the storage medium, at which the change in the property of the signal sensed from the storage medium is detected, and change a response of at least one of the detector, a read channel controller of the disk drive, or a servo controller of the disk drive based on (i) the count and (ii) the counter.

21 Claims, 13 Drawing Sheets

(56) References Cited

U.S. PATENT DOCUMENTS

| | | | |
|---|---|---|---|
| 6,381,088 B1 | 4/2002 | Despain et al. |
| 6,520,013 B1 | 2/2003 | Wehrenberg |
| 6,525,897 B2 | 2/2003 | Despain et al. |
| 6,636,385 B2 | 10/2003 | Yasuna et al. |
| 6,701,465 B1 | 3/2004 | Tashiro |
| 6,769,066 B1 | 7/2004 | Botros et al. |
| 6,771,449 B1 | 8/2004 | Ito et al. |
| 6,782,351 B2 | 8/2004 | Reichel et al. |
| 6,871,168 B1 | 3/2005 | Tanaka et al. |
| 6,903,896 B2 | 6/2005 | Miyata et al. |
| 6,980,384 B1 | 12/2005 | Shelton |
| 6,995,939 B2 | 2/2006 | Ito et al. |
| 7,023,772 B2 | 4/2006 | Yonemitsu |
| 7,141,951 B2 | 11/2006 | Hosono et al. |
| 7,237,178 B1 | 6/2007 | Sutardja et al. |
| 7,307,228 B2 | 12/2007 | Wehrenberg |
| 7,351,925 B2 | 4/2008 | Wehrenberg |
| 7,423,949 B2 | 9/2008 | Tonami et al. |
| 7,430,092 B2 | 9/2008 | Abe et al. |
| 7,538,963 B2 | 5/2009 | Che |
| 7,541,551 B2 | 6/2009 | Wehrenberg |
| 7,548,396 B2 | 6/2009 | Higashimo |
| 7,733,595 B2 | 6/2010 | Lucas et al. |
| 7,995,301 B2 | 8/2011 | Oberg |
| 8,305,703 B2 | 11/2012 | Oberg |
| 2002/0033454 A1 | 3/2002 | Cheng et al. |
| 2003/0214486 A1 | 11/2003 | Roberts |
| 2005/0044454 A1 | 2/2005 | Moshayedi |
| 2008/0301529 A1 | 12/2008 | Spanel et al. |
| 2009/0034116 A1 | 2/2009 | Higashino et al. |
| 2009/0135699 A1 | 5/2009 | Kikugawa |
| 2009/0183037 A1 | 7/2009 | Hamaguchi et al. |
| 2010/0067357 A1 | 3/2010 | Huang et al. |
| 2010/0329086 A1 | 12/2010 | Takeda |

FOREIGN PATENT DOCUMENTS

| | | |
|---|---|---|
| JP | 08-147739 | 6/1996 |
| JP | 11-120559 | 4/1999 |
| JP | 2000-276855 | 10/2000 |
| JP | 2002-42354 | 2/2002 |
| JP | 2003-331539 | 11/2003 |
| JP | 2005-526347 | 9/2005 |
| JP | 2008-004244 | 6/2006 |
| JP | 2008-165897 | 7/2008 |
| WO | WO-98/44494 | 10/1998 |
| WO | WO-03/098613 | 11/2003 |

OTHER PUBLICATIONS

Written Opinion issued in International App. No. PCT/US2010/020518, mailed Jun. 17, 2010.
Notice of Rejection in corresponding Japanese Application No. JP2011-545464, mailed Jun. 4, 2013.
Liu, U.S. Appl. No. 12/185,643, filed Aug. 4, 2008.
Notice of Reasons for Rejection for Japanese Patent Application No. 2011-545464, dated Feb. 18, 2014.
Second Office Action for Chinese Patent Application No. 201080004501.7, dated May 19, 2014.
Office Action in corresponding European Patent Application No. 10 700 900.3—1910, 4 pages (Aug. 12, 2014).

METHOD AND APPARATUS FOR DETERMINING A LOCATION OF A FEATURE ON A STORAGE MEDIUM

CROSS-REFERENCE TO RELATED APPLICATION

This application is a continuation of U.S. patent application Ser. No. 13/669,218, entitled "Method and Apparatus for Determining a Location of a Defect on a Storage Medium," filed Nov. 5, 2012, now U.S. Pat. No. 8,599,666, which is a continuation of U.S. application Ser. No. 13/189,111, filed Jul. 22, 2011, now U.S. Pat. No. 8,305,703, which is a continuation of U.S. application Ser. No. 12/684,659, filed Jan. 8, 2010, now U.S. Pat. No. 7,995,301, which claims priority under 35 U.S.C. §119(e) to U.S. Provisional Application No. 61/144,602, filed Jan. 14, 2009. The disclosures of the applications referenced above are incorporated herein by reference.

FIELD OF TECHNOLOGY

The present disclosure relates generally to disk storage devices, and more particularly, to detecting locations of defects on a disk.

DESCRIPTION OF THE RELATED ART

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Data may be written to an optical storage medium using a laser which forms a pattern of extremely small indentations, or pits, on top of a polycarbonate substrate of the optical storage medium. The areas between pits are known as lands, and together the pits and lands represent the data written to the optical storage medium. An Optical Pick-up Unit (OPU), which may include a laser and an optical sensor, is used to read the data. For example, the laser of the OPU may be directed at a track on the optical storage medium from which it is desired to read the data. The indentations of the pits relative to the lands cause light to reflect differently from the pits than from the lands. The optical storage medium is rotated by a spindle/feed motor (FM) driver during read operations to allow the optical sensor to read the pits and lands. The optical sensor senses the differences in reflection from the pits and lands in order to read the data represented by the pits and lands.

Because accurate reading of data from the optical storage medium depends on accurate sensing of differences in reflection, and because the pits are extremely small indentations, the integrity of data written on the optical storage medium is vulnerable to a defect such as a scratch or a fingerprint. Such a defect may interfere with the pattern of lands and pits and may compromise the reflective properties of the optical storage medium, thereby preventing data from being read accurately or even at all. The result may include "skips" or "blips" in audio or video playback to the user of the optical storage medium and difficulty reading data for processing.

FIG. 1 illustrates an optical storage medium 104, such as a Digital Versatile Disc (DVD) medium, having a defect 108, such as a scratch or a fingerprint, which begins in a defect origin area 112 on the optical storage medium 104. The defect origin area 112 may include a plurality of tracks 116, as shown in the magnified view of the defect origin area 112 in FIG. 1. Each of the plurality of tracks 116 has data written thereon. The data may later be read from the plurality of tracks 116 for further processing, display to a user of the optical storage medium 104, audio or video playback to the user, etc.

A defect on an optical storage medium sometimes grows in size as it extends radially across the optical storage medium. As shown in FIG. 1, the defect 108 increases in size as it extends radially across the plurality of tracks 116 within the defect origin area 112. The defect 108 causes degradation of a data layer on the optical storage medium 104 on which data on the plurality of tracks 116 is written, particularly when the defect 108 increases in size, and adversely affects the ability of a read channel, such as a read channel of a DVD player, to read data from each track across which the defect 108 extends.

FIG. 2 illustrates an output signal 200 from an optical storage device. The output signal 200 may be, for example, a read channel signal corresponding to a signal generated from reading data from an optical storage medium, such as the optical storage medium 104. The output signal 200 includes a degradation area 204 with degradation caused by a fingerprint. The degradation area 204 is characterized by a low signal level and ridges 208 corresponding to ridges of the fingerprint. FIG. 3 illustrates another output signal 300 from an optical storage device. The output signal 300 includes a degradation area 304 with severe degradation caused by a scratch. The degradation area 304 is characterized by an almost completely degraded signal level and consequently an almost total loss of data.

Data written on the optical storage medium 104 may be encoded according to an error correction coding (ECC) scheme, such as a Reed-Solomon coding scheme. In some cases, the use of ECC will allow a read channel to determine the data written on the optical storage medium 104 at the location of a defect, such as the defect 108, in spite of the presence of the defect 108. However, if the defect 108 is severe enough or large enough, ECC may not be sufficient to compensate for the loss of data. Moreover, even if ECC is sufficient to compensate for the loss of data, the defect 108 may create additional problems. Namely, the read channel makes use of a variety of control loops to continuously monitor and adjust parameters such as the timing with which data is read from the optical storage medium 104 and the amount of gain and dc offset applied to a read signal. For example, data is read according to a channel clock of the optical storage medium 104. An optical data retrieval system determines an expected channel clock based on, for example, the rotation speed of the optical storage medium 104. However, a variety of factors may cause the expected channel clock to be inaccurate. For example, off-center or elliptical rotation of the optical storage medium 104, variations in the speed of rotation of the optical storage medium 104, and a difference between the center of curvature of the track being read and the axis of rotation of the optical storage medium 104 may all contribute to timing errors. Consequently, a timing control loop is used to recover the actual channel clock to ensure proper signal timing during read operations. Similarly, gain and dc offset control loops are used to control amplification of a read signal from the OPU and to compensate for dc offset that may be introduced into the read signal as a result of factors including one or more of the factors which create timing control problems.

In the presence of the defect 108, however, the degradation of data on the optical storage medium 104 causes undesired inputs to the timing, gain, and dc offset control loops and, consequently, undesired and inaccurate control of signal timing, gain, and dc offset compensation. As a result, even after the area of the optical storage medium 104 which includes the defect 108 has passed, the adverse effects of the defect 108; namely, skips, blips, and the like, may continue until the control loops are updated based on a sufficient amount of reliable data to once again generate proper outputs.

A similar problem may occur in the presence of the defect 108 with respect to controlling positioning of the OPU to read data from the optical storage medium 104. The position of the OPU may change undesirably due to factors including, for example, those discussed above with respect to timing control. Consequently, as with timing, gain, and dc offset, the positioning of the OPU may also be monitored and updated by an additional control loop. As with the timing, gain, and dc offset control loops, however, a control loop used to position the OPU may be updated based on inaccurate data in the presence of the defect 108, causing inaccurate adjustment of the position of the OPU, which may continue even after the OPU has passed the end of the defect 108.

One known system may detect a defect, such as the defect 108, and make certain changes to, for example, the control loops used by the read channel. For example, the timing loop may be disabled in order to minimize updating of the timing loop with inaccurate data resulting from the defect 108. The system may further determine an address on the optical storage medium 104 of an ECC block within which the defect 108 was detected. If an attempt is later made to re-read the ECC block, the sensitivity of the system to defects is increased starting at the beginning of the ECC block in order to increase the likelihood that the defect 108 will be detected earlier, with the result that the timing loop will be disabled earlier and the updating thereof with inaccurate data will be further reduced.

SUMMARY OF THE DISCLOSURE

In one embodiment, an apparatus comprises a counter configured to generate counts associated with different locations, within a smallest addressable unit of data, on a storage medium of a disk drive, and a detector configured to detect a change in a property of a signal sensed from the storage medium. The apparatus also comprises a controller configured to: determine a count of the counter corresponding to a location, within a smallest addressable data unit on the storage medium, at which the change in the property of the signal sensed from the storage medium is detected, and change a response of at least one of the detector, a read channel controller of the disk drive, or a servo controller of the disk drive based on (i) the count and (ii) the counter.

In another embodiment, a method includes running a counter, wherein counts of the counter are associated with different locations, within a smallest addressable unit of data, on a storage medium of a disk drive, and detecting, with a detector device, a change in a property of a signal sensed from the storage medium. The method also includes determining, with a controller device, a count of the counter corresponding to a location at which the change in the property of the signal sensed from the storage medium is detected, and changing, with the controller, a response of at least one of the detector device, a read channel controller device of the disk drive, or a servo controller device of the disk drive based on (i) the count and (ii) the counter.

DETAILED DESCRIPTION

While the defect detection and response techniques described herein are disclosed as being used in optical disk drive systems that use one or more Digital Versatile Disc (DVD) format specifications (e.g., DVD Read-Only Memory (DVD-ROM), recordable formats DVD-R and DVD+R, rewritable formats DVD-RW and DVD+RW, and DVD Random-Access Memory (DVD-RAM)), these techniques may be used in various other types of optical disk drive systems, such as those using Blu-Ray Disc (BD) format specifications and compact disc (CD) format specifications, and are not limited to those conforming to one or more of the DVD format specifications. Further still, the techniques described herein may also be applied to other data storage devices and drive systems, such as magnetic disk drive systems.

Figure 4:
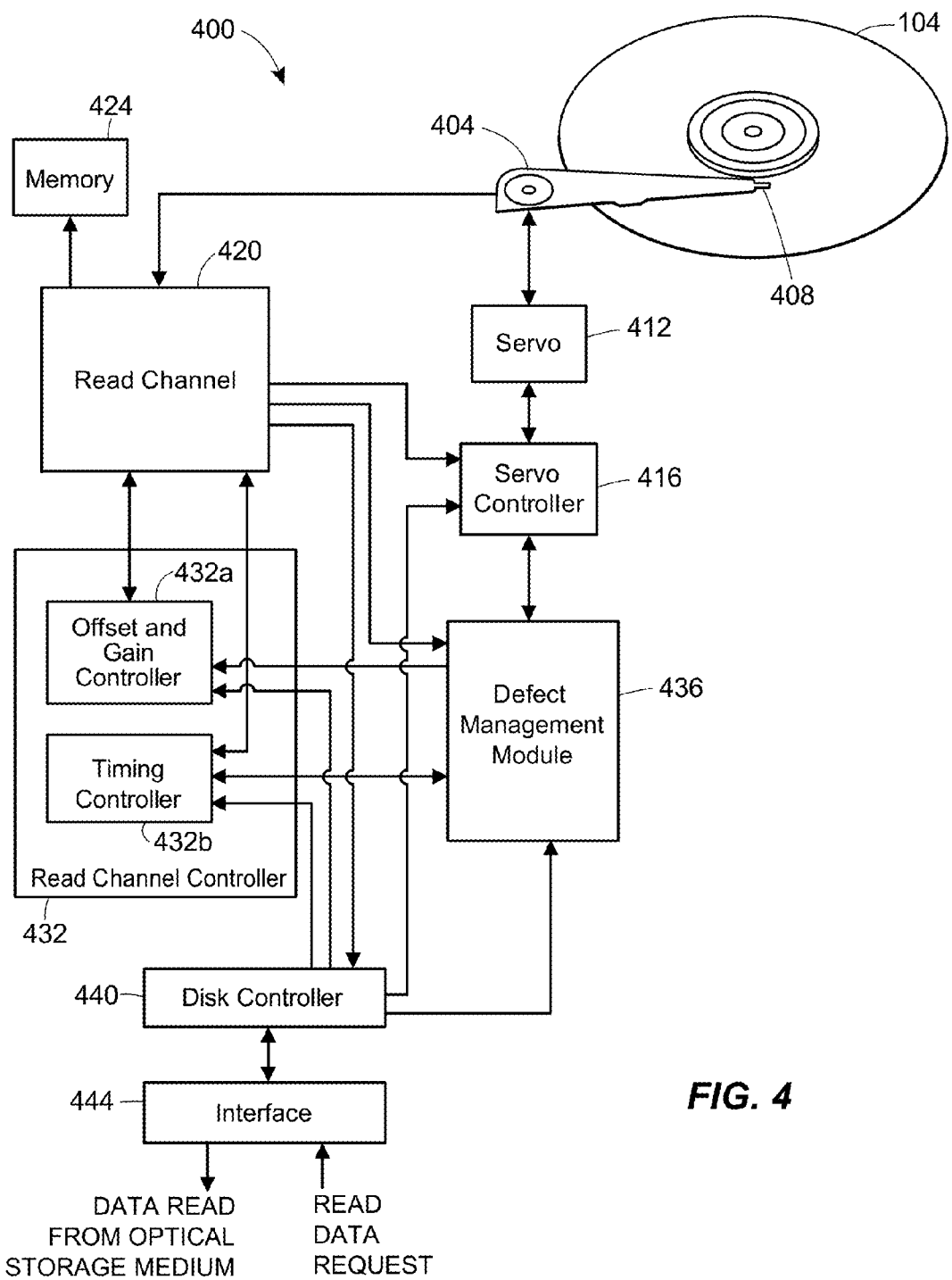
FIG. 4 is a block diagram of a disk drive system, according to one embodiment.

FIG. 4 is a block diagram of a disk drive system 400 according to one embodiment. The disk drive system 400 may be, for example, a Blu-Ray disk drive system, a DVD disk drive system, etc., such as may be found in a Blu-Ray Disc player, a DVD player, a personal computer or laptop computer, or any of a number of devices and appliances that may use optical drives. The disk drive system 400 includes the optical storage medium 104, a moving arm 404 to which is attached an OPU 408, a servo 412, a servo controller 416, a read channel 420, memory 424, a read channel controller 432, a defect management module 436, a disk controller 440, and an interface 444. The read channel controller 432 includes an offset and gain controller 432a and a timing controller 432b. In another embodiment, the offset and gain controller 432a is implemented as two distinct controllers; namely, one dc offset controller (not shown) and one gain controller (not shown). In yet another embodiment, as discussed in detail below, a voltage-controlled oscillator (VCO) (not shown in FIG. 4) may be integrated with the timing controller 432b or communicatively coupled to the timing controller 432b.

Figure 5:
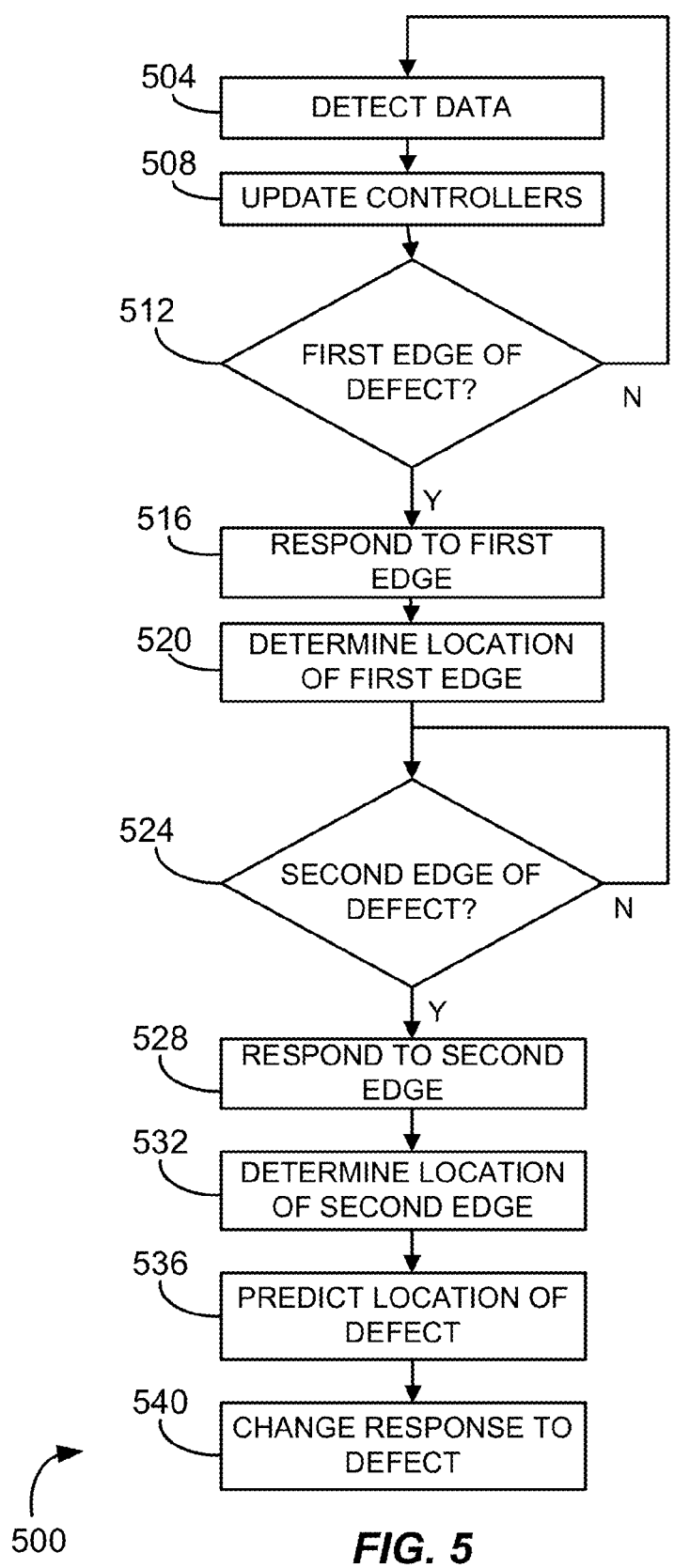
FIG. 5 is a flow chart of a method of managing a defect on an optical storage medium of a disk drive system, according to another embodiment.

With additional reference to FIG. 5, the operation of the disk drive system 400 will now be described in greater detail. FIG. 5 is a flow chart of a method 500 of managing a defect on an optical storage medium of a disk drive system, according to one embodiment. The method 500 will be described with reference to the disk drive system 400 for ease of explanation. It will be understood, however, that the method 500 may be implemented by a system other than the disk drive system 400.

At 504, data is detected from the optical storage medium 104. In one embodiment, a microprocessor (not shown) of one of the aforementioned computing devices in which the disk drive system 400 may be found may provide a read data request to the interface 444 indicating the data to be read, such as an indication of a first track on the optical storage medium 104 from which the data is to be read. The interface 444 transmits an indication of the data to be read to the disk controller 440, which then transmits signals to the servo controller 416 indicating, for example, the first track from which the data is to be read. In response to the signals from the disk controller 440, the servo controller 416 controls operation of the servo 412 to position the moving arm 404 and the OPU 408 over the first track. Although the discussion herein refers to positioning the OPU 408 over the first track, it will be understood that the servo controller 416 and servo 412 may be used to position the OPU 408 over any suitable portion of the optical storage medium 104 as indicated by the read data request, such as a particular data sector on the first track. The OPU 408 may include a laser and an optical sensor to sense differing reflections from lands and pits on the first track and thereby read the data stored on the optical storage medium 104.

With continued reference to 504, the detection of data stored on the optical storage medium 104 may, in one embodiment, be further achieved as follows. The read channel 420 receives an analog read signal from the OPU 408, generates a digital signal based on the analog read signal, and detects data represented by the digital signal. In one embodiment, the detected data may be written to the memory 424, which may include RAM, ROM, flash memory, and/or any other suitable electronic data storage medium, for further use by a computing device in which the disk drive system 400 is disposed. In another embodiment, the detected data may be provided to the disk controller 440, and may in turn be provided from the disk controller 440 to the interface 444. The interface 444 may then further provide the detected data to the aforementioned microprocessor. The read channel 420 may further generate position signals based on position information read from the optical storage medium 104 and provide these position signals to the servo controller 416. Accordingly, the servo controller 416 may further control operation of the servo 412 in response to the position signals from the read channel 420.

Next, at 508, controllers within the disk drive system 400 are updated in order to adjust various parameters provided to the read channel 420. These parameters may include, for example, signal timing, gain, and dc offset parameters used to ensure proper timing, amplification, and dc offset compensation during read operations. In the disk drive system 400, one or both of the digital signal and the detected data are used to update the controllers 432a and 432b within the read channel controller 432. The controllers 432a and 432b, in response to the updates from the digital signal and/or the detected data, adjust the aforementioned parameters provided to the read channel 420. These parameters may be adjusted in response to variations caused by, for example, off-center or elliptical rotation of the optical storage medium 104, variations in the speed of rotation of the optical storage medium 104, a difference between the axis of rotation of the optical storage medium 104 and the center of curvature of the first track or any other track being read, etc. Additionally, one or both of the digital signal and the detected data may be used to update the servo controller 416 in response to, for example, one or more of the foregoing factors, in order to provide accurate control of the servo 412.

Figure 1:
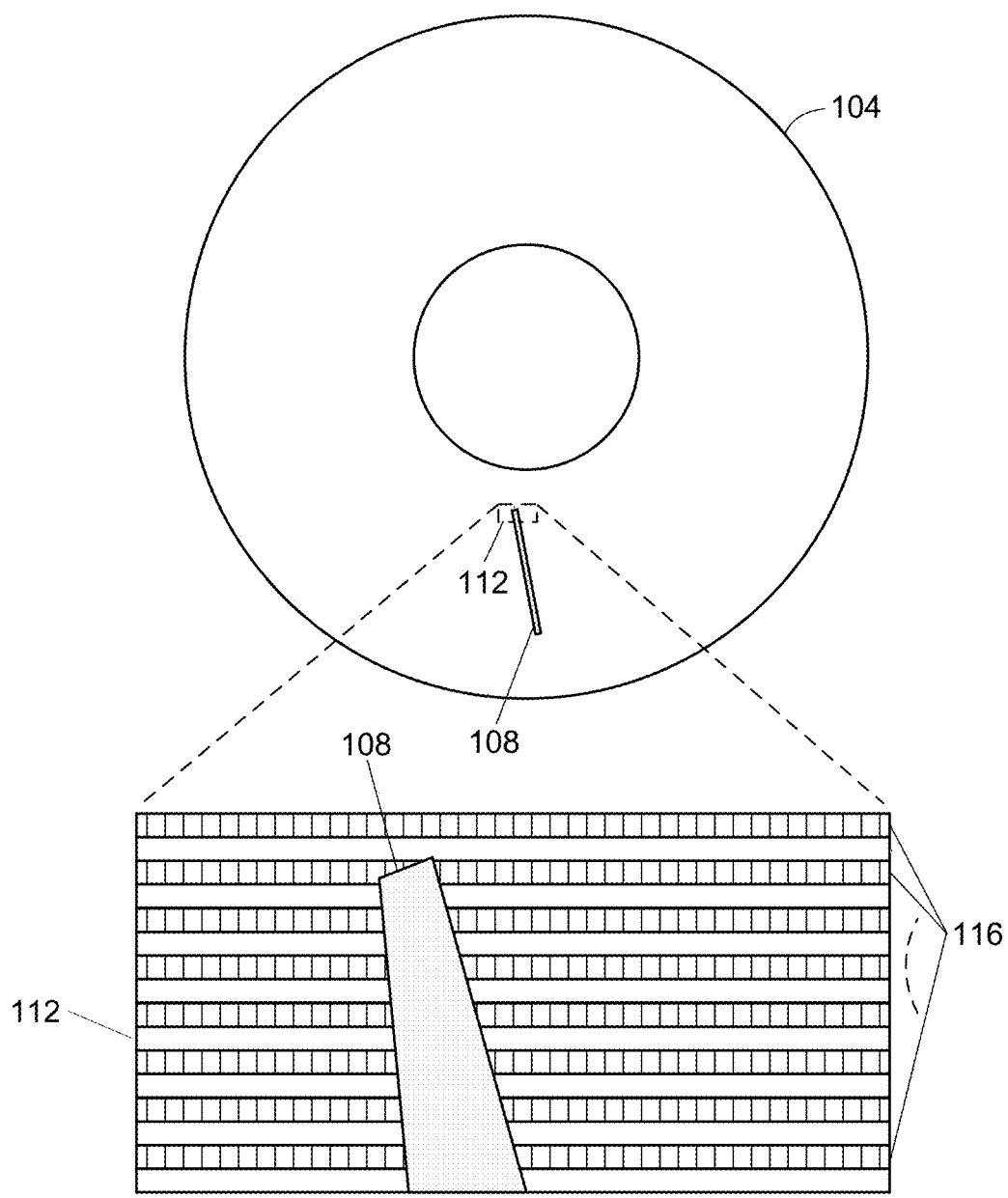
FIG. 1 illustrates an optical storage medium having a defect.
Figure 2:
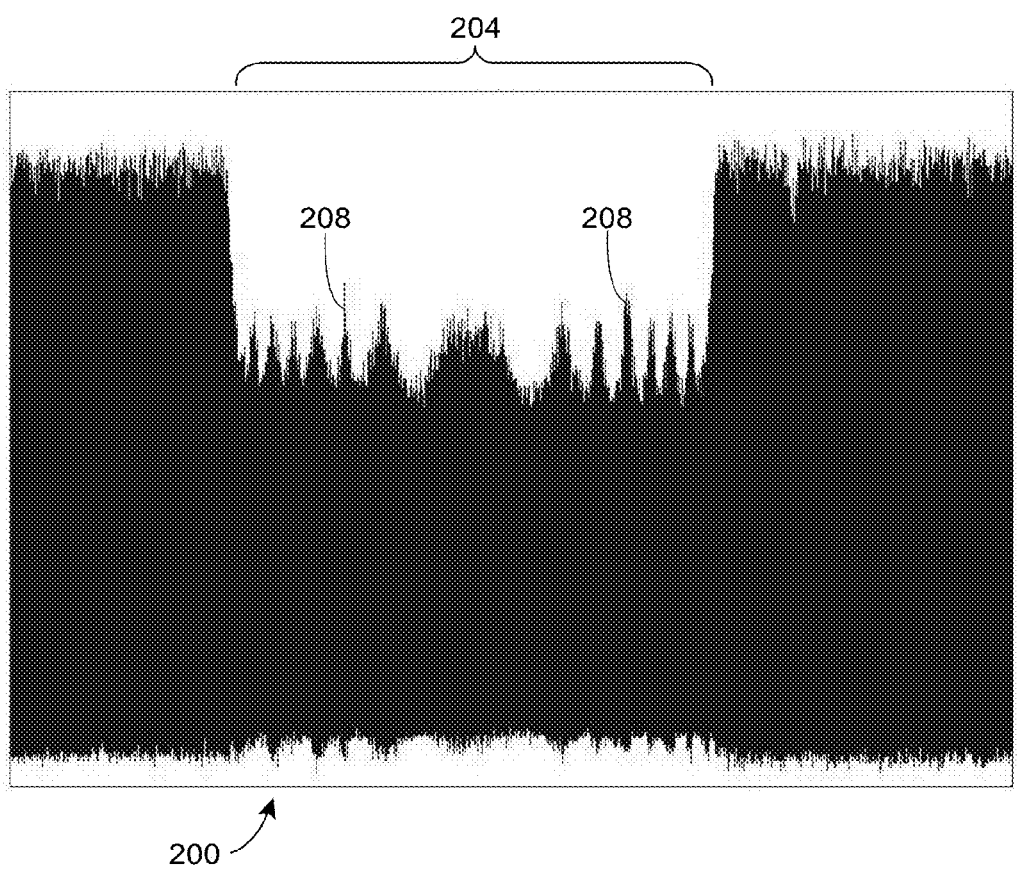
FIG. 2 illustrates an output signal from an optical storage device including degradation caused by a fingerprint.
Figure 3:
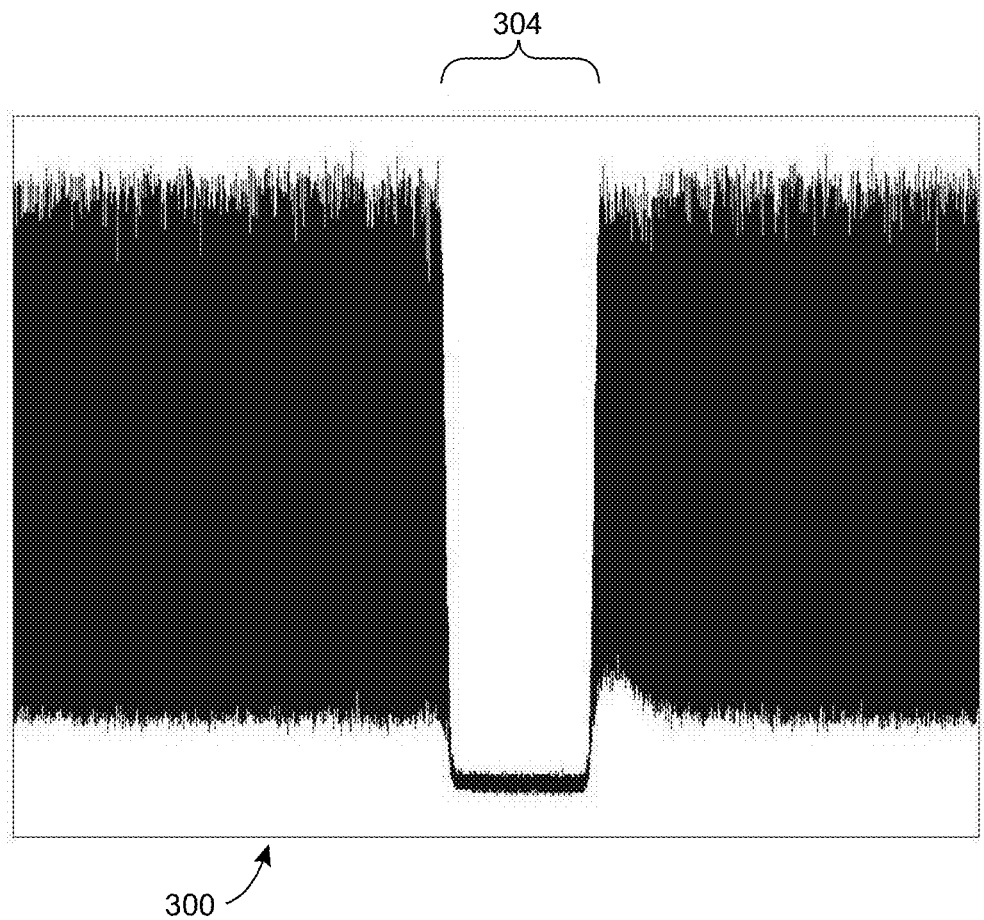
FIG. 3 illustrates an output signal from an optical storage device including severe degradation caused by a scratch.

Next, at 512, it is determined whether a first edge of a defect, such as a beginning of the defect 108 discussed with respect to FIG. 1, has been detected on the optical storage medium 104. The first edge of the defect 108 may be detected within the disk drive system 400 in any of a variety of ways. For example, one or both of the digital signal and the detected data from the read channel 420 may be provided to the defect management module 436. Moreover, in one embodiment, the timing controller 432b may provide timing control to the defect management module 436. Further still, the disk controller 440 may provide defect detection settings to the defect management module 436, and the defect management module 436 may use the defect detection settings to detect the first edge of the defect 108. The disk controller 440 may be, for example, a controller executing machine-readable instructions. The machine-readable instructions may be stored as firmware, software, etc. The defect detection settings may specify, for example, the amount of degradation in the digital signal that indicates a defect. In one embodiment, the defect management module 436 detects the first edge of the defect 108 based on a determination that the amplitude of the envelope of the digital signal at a particular location of the optical storage medium 104 is below a threshold set by the disk controller 440, for example. In another embodiment, the first edge of the defect 108 may be detected within the disk drive system 400 by using the servo controller 416 to detect defects based on the amplitude of signals received from the servo 412.

If it is determined at 512 that the first edge of the defect 108 has been detected, the flow proceeds to 516. If the first edge of the defect 108 has not been detected, the flow returns to 504, from which point the method may continue as described herein At 516, the disk drive system 400 responds to the first edge of the defect 108. In one embodiment, the defect management module 436 may respond to the first edge of the defect 108 by disabling one or more of the controllers 432a and 432b upon detecting the first edge of the defect 108 in order to avoid introducing inaccurate updates to one or more of the controllers 432a and 432b. In another embodiment, the servo controller 416 is similarly disabled in response to the detection of the first edge of the defect 108, instead of or in addition to the one or more of the controllers 432a and 432b, if the defect management module 436 determines, based on the detected data from the read channel 420 or based on the amplitude of signals received from the servo 412, that the defect 108 is causing radial tracking problems in operation of the OPU 408. The term "disabling," as used herein with reference to one or more of the controllers 432a and 432b, and with reference to the servo controller 416, refers to preventing further updates of the outputs of one or more of the controllers 416, 432a, and 432b, thereby preventing further adjustment of signal timing, gain, dc offset, etc.

Next, at 520, the location at which the first edge of the defect 108 was detected is determined. In one embodiment, the defect management module 436 determines, within a smallest addressable unit of data stored on the optical storage medium 104, the location at which the first edge of the defect 108 was detected. The defect management module 436 may, but need not, determine or identify the particular smallest addressable unit of data within which the first edge of the defect 108 was detected. For example, in a DVD medium, the smallest addressable unit of data is an eight-to-fourteen modulation (EFM) frame, which includes 1,488 bits. Thus, for example, the defect management module 436 may determine, using techniques discussed in further detail below, a position or bit number within an EFM frame, though not necessarily a specifically identified EFM frame, at which the first edge of the defect 108 was detected on the first track.

Next, at 524, it is determined whether a second edge, or end, of the defect 108 has been detected. The second edge of the defect 108 may be detected within the disk drive system 400 in any of a variety of ways. For example, the defect management module 436 may use defect detection settings provided by the disk controller 440, as discussed above, to detect the second edge of the defect 108. More particularly, in one embodiment, the defect management module 436 detects the second edge of the defect 108 based on a determination that the amplitude of the envelope of the digital signal provided from the read channel 420 is at or above the threshold used to detect the first edge of the defect 108 at 512. In another embodiment, the servo controller 416 may detect the second edge of the defect 108 based on, for example, an increase in the amplitude of signals received from the servo 412 relative to the amplitude of the signals received from the servo 412 when the OPU is at the location at which the first edge of the defect 108 was detected. If it is determined at 524 that the second edge of the defect 108 has been detected, the flow proceeds to 528. If the second edge of the defect 108 has not been detected, the flow remains at 524 until the second edge is detected.

At 528, the disk drive system 400 responds to the second edge of the defect 108. In one embodiment, the defect management module 436 may respond to the second edge of the defect by re-enabling the one or more of the controllers 432a and 432b which were disabled at 516. The term "re-enabling," or "re-enabled," as used herein with reference to the one or more of the controllers 432a and 432b, refers to allowing further updates of the outputs of the one or more of the controllers 432a and 432b following disabling of the one or more of the controllers 432a and 432b. In another embodiment, the defect management module 436 similarly re-enables the servo controller 416 in response to the detection of the second edge of the defect 108 if the defect management module 436 determines, based on the detected data from the read channel 420 or based on the amplitude of signals received from the servo 412, that the defect 108 is no longer causing radial tracking problems in operation of the OPU 408.

Next, at 532, the location at which the second edge of the defect 108 was detected is determined. As in 520, the defect management module 436 may determine, within a smallest addressable unit of data stored on the optical storage medium 104, the location at which the second edge of the defect 108 was detected, as further described below. The defect management module 436 may, but need not, determine or identify the particular smallest addressable unit of data within which the second edge of the defect 108 is located.

Next, at 536, an actual location of the defect 108 is predicted. The read channel 420 must process data read from the optical storage medium 104 in order for the defect management module 436 to detect the first edge of the defect 108. Thus, the defect management module 436 will not generally detect the first edge of the defect 108 until slightly after the defect 108 actually begins. Similarly, because of this processing delay, the defect management module 436 will not generally detect the second edge of the defect 108 until slightly after the defect 108 actually ends. Thus, the defect management module 436 may predict, within a smallest addressable unit of data stored on the optical storage medium 104, an actual location of the defect 108. For example, the defect management module 436 may predict an actual location of the first edge of the defect 108 and an actual location of the second edge of the defect 108. The defect management module 436 may store an indication of the predicted location for later use as discussed below. The defect management module 436 may make this prediction in accordance with techniques discussed in further detail below.

Next, at 540, the disk drive system 400 changes its response to the defect 108 during a subsequent attempt to read data from an area of the optical storage medium 104 which is affected by the defect 108. More particularly, in one embodiment, the disk drive system 400 may change its response to the defect 108 during the subsequent attempt based on the location of the OPU 408 relative to the data stored on the storage medium and the stored indication of the location of the defect 108. As further discussed below, the disk drive system 400 may thus change its response, for example, when the OPU 408 is at the predicted location of the defect 108 as discussed with respect to 536, or when the OPU 408 is at a location of the optical storage medium 104 in proximity to the predicted location.

In one embodiment, and with continued reference to 540, in the event that data stored at the location of the defect 108 is unable to be read even after utilizing an error correction coding (ECC) scheme, the read channel controller 432 may provide a re-read signal to the servo controller 416 in order to control operation of the servo 412 to cause the OPU 408 to attempt to re-read the data affected by the defect 108. Thus, during the attempt to re-read, the defect management module 436 may monitor a location of the OPU 408 relative to the data stored on the optical storage medium 104, as further discussed below. In one embodiment, the defect management module 436 changes its own response to the defect 108 during the re-read attempt when the OPU 408 is at the predicted location of the defect 108, or when the OPU 408 is at a location of the optical storage medium 104 in proximity to the predicted location. In another embodiment, in addition to or instead of changing its own response to the defect 108, the defect management module 436 changes a response of one or both of the read channel controller 432 and the servo controller 416.

With reference still to 540, the defect management module 436 may change its own response and/or the response of the read channel controller 432 and/or the response of the servo controller 416 to the defect 108 in any of a variety of ways. For example, the defect management module 436 may generate a defect detection signal when, during the attempt to re-read, the OPU 408 is at the predicted location of the first edge of the defect 108. Further, in one embodiment, the defect detection signal causes one or both of the read channel controller 432 and the servo controller 416 to go into a defect mode. The defect mode may or may not be the same mode of operation of the read channel controller 432, or the same mode of operation of the servo controller 416, which is used to respond to the first edge of the defect 108 during the initial data read. For example, in response to the defect detection signal, one or more of the controllers 432a and 432b may be disabled. In another embodiment, the servo controller 416 may be disabled instead of or in addition to the one or more of the controllers 432a and 432b. As a result, inaccurate updates to the one or more of the controllers 432a and 432b and/or the servo controller 416 may be minimized, thereby increasing the likelihood that the read channel 420 will accurately detect the data affected by the defect 108 during the re-read attempt. Additionally, because of the minimization of inaccurate updates to the one or more of the controllers 432a and 432b and/or the servo controller 416, the one or more of the controllers 432a and 432b and/or the servo controller 416 will become accurately updated more quickly after the end of the defect 108.

In another embodiment, one or more of the controllers 432a and 432b may receive forced updates from the defect management module 436. In still another embodiment, the servo controller 416 may receive forced updates from the defect management module 436 instead of or in addition to the one or more of the controllers 432a and 432b. Such updates may be suitable inputs to the one or more of the controllers 432a and 432b and/or the servo controller 416 which will, for example, optimize the performance of the read channel 420, and/or the performance of the servo controller 416 and servo 412, after an attempt is made to re-read data at the location of the defect 108.

Continuing with respect to 540, various defect modes of the read channel controller 432 and the servo controller 416, such as the modes discussed above, may be effected by a setting or settings of the controllers 432a and 432b and/or the servo controller 416, which settings may be provided to the controllers 432a and 432b and/or the servo controller 416, for example, by the disk controller 440. By appropriately generating the defect detection signal, the defect management module 436 selects which setting or settings to use.

In another embodiment with respect to 540, if a requirement for continuity of audio or video playback of data from the optical storage medium 104 dictates that a re-read operation may not be undertaken, the defect management module 436 may store the predicted location of the first edge of the defect 108 for a suitable period of time, or indefinitely, and generate a defect detection signal when, during a later attempt to re-read the data affected by the defect 108, the OPU 408 is at, for example, the predicted location of the first edge of the defect 108.

In yet another embodiment with respect to 540, and as discussed in further detail below, the defect management module 436 may change its response to the defect 108 by changing its defect detection sensitivity when the OPU 408 is positioned at the predicted location of the first edge of the defect 108 or at a location in proximity to the predicted location of the first edge of the defect 108. For example, the location in proximity to the predicted location of the first edge of the defect 108 may be a location on the order of 10 or 100 bits away from the predicted location of the first edge of the defect 108. In one embodiment, the location in proximity may be determined experimentally. In this manner, performance may be optimized for certain common types of defects on the type of optical storage medium 104 which is used. In another embodiment, the defect management module 436 may try different locations in proximity during an attempt to read data affected by the defect 108. For instance, the number of errors caused by the defect 108 can be, in some circumstances, more than what an error correction code can handle. By adjusting the location in proximity as part of a re-read strategy, the defect management module 436 may try different locations in proximity in an attempt to find a location in proximity that works well for the defect 108. This may be helpful when a default number of bits between the predicted location of the first edge of the defect 108 and the location in proximity works well for some defects but not for other defects, such as the defect 108.

In one embodiment, the defect management module 436 may, in accordance with a setting provided to it by, for example, the disk controller 440, change its defect detection sensitivity by specifying a decreased amount of degradation in the digital signal that indicates a defect. In this manner, during an attempt to re-read the data affected by the defect 108, the defect management module 436 will be more likely to detect the first edge of the defect 108 closer to where the defect 108 actually begins than the defect management module 436 otherwise would under a normal response. Additionally, the defect management module 436 may, for example, disable one or more of the controllers 432a and 432b closer to the actual location of the first edge of the defect 108. In another embodiment, the defect management module 436 may disable the servo controller 416, instead of or in addition to the one or more of the controllers 432a and 432b, closer to the actual location of the first edge of the defect 108. Accordingly, inaccurate updates to the controllers 432a and 432b and/or 416 may be minimized, and the negative consequences of such inaccurate updates avoided.

In still another embodiment with respect to 540, and as discussed in further detail below, the defect management module 436 may change its response to the defect 108, and/or the response of the read channel controller 432, and/or the response of the servo controller 416, based on a determination that the defect 108 is of relatively minimal severity (such as caused by a fingerprint) and that the data affected by the defect 108 is more likely to be successfully re-read by adjusting or maintaining settings of the controllers 432a and 432b and/or adjusting or maintaining settings of the servo controller 416. For example, the defect management module 436 may enable settings of the offset and gain controller 432a which cause an increase in gain applied by the offset and gain controller 432a to the read signal when the OPU 408 is positioned at the predicted location of the first edge of the defect 108 or at a location in proximity to the predicted location of the first edge of the defect 108. For example, the location in proximity to the predicted location of the first edge of the defect 108 may be a location on the order of 10 or 100 bits away from the predicted location of the first edge of the defect, and may be determined in a manner similar to that described above with respect to the embodiment in which the defect management module 436 may change its defect detection sensitivity. For example, the defect management module 436 may determine that the defect 108 is of relatively minimal severity if an amplitude of the envelope of the digital signal at the location at which the first edge of the defect 108 was detected is above a threshold value set by the disk controller 440. In one embodiment, the defect management module 436 nonetheless disables one or both of the timing controller 432b and the servo controller 416 while increasing the gain applied by the offset and gain controller 432a. In another embodiment, one or both of the servo controller 416 and the timing controller 432b are not disabled in view of the relatively minimal severity of the defect 108. Additionally, in the embodiment wherein the offset and gain controller 432a is implemented as two distinct controllers (i.e., one dc offset controller and one gain controller), the defect management module 436 may disable the dc offset controller while nonetheless increasing gain applied by the gain controller.

In yet another embodiment with respect to 540, and as discussed in further detail below with respect to FIGS. 11-13, the defect management module 436 may change its response to the defect 108, and/or the response of the read channel 420, and/or the response of the servo controller 416, with respect to other data tracks of the optical storage medium 104, such as a second track. For example, as discussed above, the defect management module 436 may determine a position or bit number within an EFM frame at which the first edge of the defect 108 was detected on the first track, and a position or bit number within the same EFM frame or another EFM frame at which the second edge of the defect 108 was detected on the first track. It may be desirable to utilize the information about the detected location of the defect 108 on the first track to accurately predict another location of the defect on another track of the optical storage medium 104, such as a second location of the defect on the second track. That is, the defect management module 436 may utilize the positions at which the first edge and the second edge of the defect 108 were detected on the first track to predict the second location of the defect 108 on the second track. Methods among others for predicting the location of the defect 108 on another track, such as the second track, are discussed in detail below. As just one example, however, the second location of the defect 108 on the second track may be predicted by assuming that the defect 108 propagates radially across the optical storage medium 104 from the detected location of the defect 108 on the first track. The radius of the optical storage medium 104 across which the defect 108 is assumed to propagate may be determined by detecting the defect 108 on the first track in conjunction with tracking an angle of rotation of the optical storage medium 104 in accordance with, for example, one or more embodiments described below with respect to FIGS. 6 and 7.

With further reference to 540, after predicting the second location of the defect 108 on the second track, the defect management module 436 may respond to the defect 108 on the second track in one of the manners discussed above or in any suitable manner. For example, on the second track, the defect management module 436 may generate a defect detection signal when the OPU 408 is positioned at the predicted second location of the defect 108 and disable one or more of the controllers 432*a* and 432*b* and/or the servo controller 416. Alternatively, the defect management module 436 may increase its defect detection sensitivity when the OPU 408 is positioned at or in proximity to the predicted second location, or may increase gain applied by the offset and gain controller 432*a* when the OPU 408 is positioned at or in proximity to the predicted second location. Accurate prediction, in accordance with the teaching below, of the second location of the defect 108 on the second track may yield benefits when reading data from the second track such as those discussed above. For example, as discussed with respect to FIG. 1, the defect 108 frequently increases in size as it extends radially across the plurality of tracks 116. Therefore, the defect management module 436 may determine where the defect 108 begins while the defect 108 poses less of a threat to stable operation on the first track, and may change its response to the defect 108 accordingly as the second and subsequent tracks of the optical storage medium 104 are read and the defect 108 becomes more problematic as it increases in size.

Figure 6:
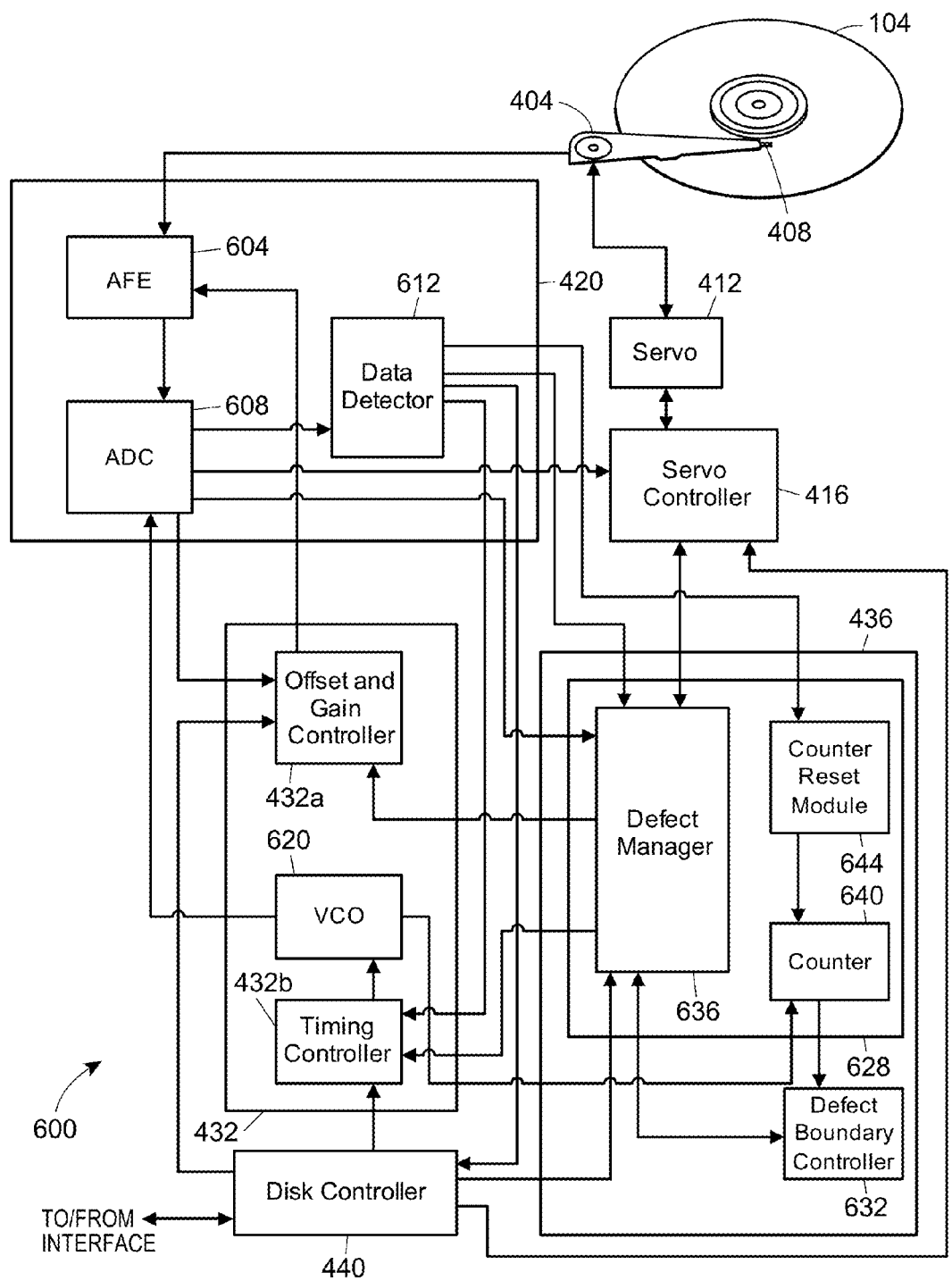
FIG. 6 is a block diagram of a disk drive system including an implementation of a defect management module, according to another embodiment.

Referring now to FIG. 6, there is illustrated a disk drive system 600 including an implementation of the defect management module 436 according to one embodiment. As illustrated in FIG. 6, the disk drive system 600 includes the optical storage medium 104, the moving arm 404, the OPU 408, the servo 412, the servo controller 416, the read channel 420, the read channel controller 432, the defect management module 436, and the disk controller 440. The memory 424 and the interface 444 have been omitted from FIG. 6 for the sake of simplicity, but it will be understood that the disk drive system 600 may further include one or both of the memory 424 and the interface 444, such as in the manner discussed with respect to the disk drive system 400. In the disk drive system 600, the read channel 420 includes an analog front end (AFE) 604, an analog-to-digital converter (ADC) 608, and a data detector 612. The read channel controller 432 includes the offset and gain controller 432*a*, the timing controller 432*b*, and a voltage-controlled oscillator (VCO) 620. Additionally, in the disk drive system 600, the defect management module 436 includes a defect response module 628 and a defect boundary controller 632. The defect response module 628 further includes a defect manager 636, a counter 640, and a counter reset module 644.

With reference back to 504, the operation of the read channel 420 will now be described in greater detail. As discussed above with respect to FIG. 4, an analog read signal is received from the OPU 408 when data is read from the optical storage medium 104. More particularly, in the disk drive system 600, the analog read signal is received at the AFE 604. The offset and gain controller 432*a* is communicatively coupled to the AFE 604 to adjust the amplitude of the analog read signal to a level suitable for processing by the remainder of the read channel 420 and to remove dc offset introduced into the analog read signal by, for example, an off-center position of the OPU 408 over a track. The analog output of the AFE 604 is then received by the ADC 608, which samples the analog output according to a channel clock. The channel clock is generated based on the spacing of bits written on the optical storage medium 104 and, therefore, corresponds to the timing of the data read from the optical storage medium 104. For example, in the embodiment shown in FIG. 6, the VCO 620 generates the channel clock which is provided to the ADC 608. In this embodiment, the timing controller 432*b* may apply a suitable voltage to the input of the VCO 620 to vary the frequency of oscillation of the VCO 620 in response to variations in the spacing of bits on the optical storage medium 104. In one embodiment, the VCO 620 does not provide a clock to the servo controller 416. Instead, the servo controller 416 may include a separate ADC (not shown) which is controlled by a fixed clock (not shown).

With continued reference back to 504, the ADC 608 samples the analog output of the AFE 604 to generate the digital signal discussed above with respect to FIG. 4. The digital signal represents data read from the optical storage medium 104, which is then provided to the data detector 612. The data detector 612 demodulates the digital signal to detect the data bits originally written to the optical storage medium 104.

With reference back to 508, one or both of the digital signal and the detected data are used to update one or more of the servo controller 416, the offset and gain controller 432*a*, and the timing controller 432*b*. In the disk drive system 600 of FIG. 6, the digital signal from the ADC 608 is used to update the servo controller 416 and the offset and gain controller 432*a*. The servo controller 416 monitors the amplitude of the digital signal, and the offset and gain controller 432*a* monitors the amplitude and dc offset of the digital signal, to determine the appropriate signals to be input to the servo 412 and the AFE 604, respectively, to ensure that proper tracking and proper amplification and dc offset compensation, respectively, occur during subsequent reading of the optical storage medium 104. Additionally, in the embodiment illustrated in FIG. 6, the detected data is input from the data detector 612 to the timing controller 432*b*. The timing controller 432*b* determines, based on the detected data, the timing adjustments necessary to ensure that the ADC 608 samples the analog output of the AFE 604 at appropriate times in order for the data detector 612 to properly demodulate the digital output of the ADC 608. After determining the necessary timing adjustments, the timing controller 432*b* adjusts the voltage input to the VCO 620 in order to adjust the channel clock provided by the VCO 620 to the ADC 608.

With continued reference back to 508, although the disk drive system 600 has been disclosed as having the digital signal from the ADC 608 used to adjust the servo controller 416 and the offset and gain controller 432*a*, and the detected data from the data detector 612 used to adjust the timing controller 432*b*, suitable variations will be contemplated by one of ordinary skill in the art in light of the disclosure and teachings provided herein. For example, the quality of the digital signal from the ADC 608 may be assessed by the timing controller 432*b* in order to determine the necessary timing adjustments, instead of determining such adjustments based on the detected data from the data detector 612.

With additional reference to FIGS. 6A, 7, and 8, the operation of the disk drive system 600 will now be described in greater detail. FIG. 7 is a flow chart of a method 700 of determining a location of a defect on an optical storage medium of a disk drive system, according to one embodiment. The method 700 will be described with reference to the disk drive system 600 for ease of explanation. It will be understood, however, that the method 700 may be implemented by a system other than the disk drive system 700.

At 704, it is determined whether a first edge of a defect, such as a beginning of the defect 108, has been detected on the optical storage medium 104. In one embodiment, in the disk drive system 600, both the digital signal from the ADC 608 and the detected data from the data detector 612 are input to the defect manager 636. The defect manager 636 examines both the digital signal and the detected data to detect defects. More particularly, the defect manager 636 may include a defect detector (not shown) which detects defects using settings provided by the disk controller 440, as further discussed with respect to FIGS. 4 and 5. Using the settings provided by the disk controller 440, the defect manager 636 may detect the first edge of the defect. Alternatively, the defect manager 636 may examine either the digital signal or the detected data, but not both, to detect defects. In yet another embodiment, the first edge of the defect 108 may be detected within the disk drive system 600 by using the servo controller 416 to detect defects based on the amplitude of signals received from the servo 412. If it is determined at 704 that the first edge of the defect 108 has been detected, the flow proceeds to 708. If the first edge of the defect 108 has not been detected, the flow remains at 704 until the first edge of the defect 108 is detected.

At 708, the defect manager 636 may respond to the first edge of the defect 108 by disabling one or both of the offset and gain controller 432*a* and the timing controller 432*b* and, in one embodiment, the servo controller 416 instead of or in addition to one or both of the controllers 432*a* and 432*b*.

Next, at 712, a first count of the counter 640, and a first counter reset location, are determined. The first count corresponds to a location on the optical storage medium 104 at which the first edge of the defect 108 was detected. More specifically, the counter 640 may generate counts associated with different locations on the optical storage medium 104. In particular, as discussed in further detail below, each count of the counter 640 may correspond to a predetermined number of periods of the channel clock of the optical storage medium 104.

Figure 8:
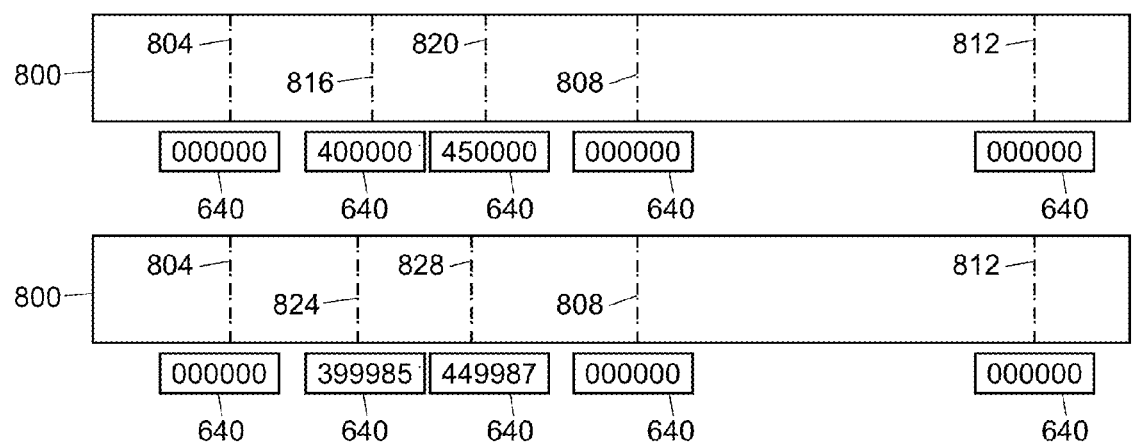
FIG. 8 depicts two illustrations of a track of an optical storage medium, according to still another embodiment.

With continued reference to 712, the first counter reset location may be determined by the counter reset module 644, as best seen in FIG. 8. FIG. 8 shows two illustrations of a track 800 of the optical storage medium 104 (not shown). The significance of the second, or bottom, illustration will be explained below. As to the first illustration, FIG. 8 shows locations 804, 808, 812, 816, and 820 on the track 800. In one embodiment, location 804 is the first counter reset location and locations 808 and 812 are additional counter reset locations. More specifically, each of the counter reset locations 804, 808, and 812 may be a location of a recognizable data boundary on the optical storage medium 104. For example, on a DVD medium, data is arranged into frames which are each 1,488 bits long. The frames are arranged into sectors which include 26 frames each, and the sectors are further arranged into ECC blocks, which include 16 sectors each. By monitoring the detected data bits from the optical storage medium 104 as provided by the data detector 612, the counter reset module 644 may determine when a boundary of any such grouping of data occurs and thereupon perform a reset of the counter 640 at the corresponding counter reset location, returning the count of the counter 640 to zero. Moreover, it will be recognized that detection of such boundaries is not limited to the detection of boundaries of frames, sectors, and ECC blocks, nor to the detection of such boundaries on a DVD medium. Rather, one or more embodiments of the present invention contemplate detection of any recognizable data boundary, such as a boundary of a header on a DVD-RAM medium, a boundary of an ECC cluster on a Blu-Ray Disc medium, or any suitable boundary on any suitable data storage medium.

Locations 816 and 820 on the track 800 of FIG. 8 are the locations at which the first edge and second edge of the defect 108 were detected, respectively. As shown in FIG. 8, the first counter reset location 804 is situated before (i.e., read prior to) the location 816 at which the first edge of the defect 108 was detected. The significance of the various depictions of the counter 640 in FIG. 8 will be explained below With further reference to 712 and FIG. 8, in another embodiment of the present invention, the counter reset locations 804, 808, and 812 may be predetermined angular positions on the first track of the optical storage medium 104. For example, a spindle motor used to drive a spindle/feed motor (FM) driver which rotates the optical storage medium 104 during read operations may generate periodic pulses. The counter reset module 644 may be electrically coupled to the spindle/FM driver to detect and process the pulses in order to track an angle of rotation of the optical storage medium 104 and perform a reset of the counter 640 at the predetermined angular positions on the first track of the optical storage medium 104. In one embodiment, the counter 640 may be reset in response to the pulses after every 90 degrees of rotation, and thus the counter reset locations 804, 808, and 812, while not depicted as such in FIG. 8, may correspond to locations on the first track which are at 90 degree angles with respect to one another. In another embodiment, the angle of rotation of the optical storage medium 104 may instead be tracked using the counter 640, such as by comparing counts of the counter to a known number of channel clocks of the optical storage medium 104 occurring over a particular degree of rotation of the optical storage medium 104.

With continued reference to 712 and FIG. 8, after the counter 640 is reset at the first counter reset location 804, the count of the counter is zero, as indicated in the depiction of the counter 640 in FIG. 8 below the first counter reset location 804. The counter 640 begins counting from the first counter reset location 804. As discussed above, each count of the counter 640 corresponds to a predetermined number of periods of the channel clock of the optical storage medium 104. For example, the counter 640 may receive the channel clock from the output of the VCO 620. In this embodiment, each count of the counter 640 indicates the occurrence of one period of the channel clock. Alternatively, the counter 640 may be implemented as a smaller and consequently less expensive counter by including a clock divider within the counter 640 which may, for example, divide the channel clock input to the counter 640 by 2, 4, 8, 16, etc. In this embodiment, each count of the counter 640 indicates 2, 4, 8, 16, etc. periods of the channel clock, respectively. Preferably, however, if the first counter reset location 804 is a predetermined angular position on the first track of the optical storage medium 104, as determined by tracking the angle of rotation of the optical storage medium 104, the counter 640 does not include the clock divider. The clock divider can be omitted in this embodiment. For example, one or more of the techniques described above for tracking the angle of rotation of the optical storage medium 104 may not be able to accomplish such tracking with sufficiently high resolution to accommodate a reduction in the precision of the counter 640.

Continuing as to 712 and FIG. 8, the count of the counter 640 at the time the defect manager 636 detects the first edge of the defect 108 is determined to be the first count corresponding to the location 816 at which the first edge of the defect 108 was detected. More particularly, because the first count corresponds to a number of periods of the channel clock of the optical storage medium 104 occurring since the counter reset module 644 performs the reset of the counter 640 at the first counter reset location 804, it will be appreciated that the first count therefore indicates an amount of data, such as a number of data bits, stored on the optical storage medium 104 between the first counter reset location 804 and the location 816 at which the first edge of the defect 108 was detected. Accordingly, the first count of the counter 640 corresponds to a location, within a smallest addressable unit of data stored on the optical storage medium 104, at which the first edge of the defect 108 was detected. For example, in the embodiment of FIG. 8, the first count of the counter is the decimal number 400,000, as shown by the depiction of the counter 640 in FIG. 8 below the location 816, thus indicating that 400,000 data bits are stored on the optical storage medium 104 between the first counter reset location 804 and the location 816.

As best described with reference to FIG. 6A, the first counter reset location 804 and the first count of the counter 640 may be stored in a memory. FIG. 6A illustrates a detailed view of the defect boundary controller 632, according to one embodiment. As shown in FIG. 6A, the defect boundary controller 632 includes a processor 648 and a memory 652. The memory 652 includes a first register ("Register 1") 656 and a second register ("Register 2") 660. In operation, when the defect manager 636 detects the first edge of the defect 108, the defect manager 636 may, for example, provide a defect detection signal to the processor 648 of the defect boundary controller 632. The defect detection signal may be generated by the aforementioned defect detector (not shown) which may be included within the defect manager 636. The processor 648 receives the defect detection signal from the defect manager 636 and thereupon records the first count, as received from the counter 640, in the memory 652, such as in the first register 656.

Figure 6A:
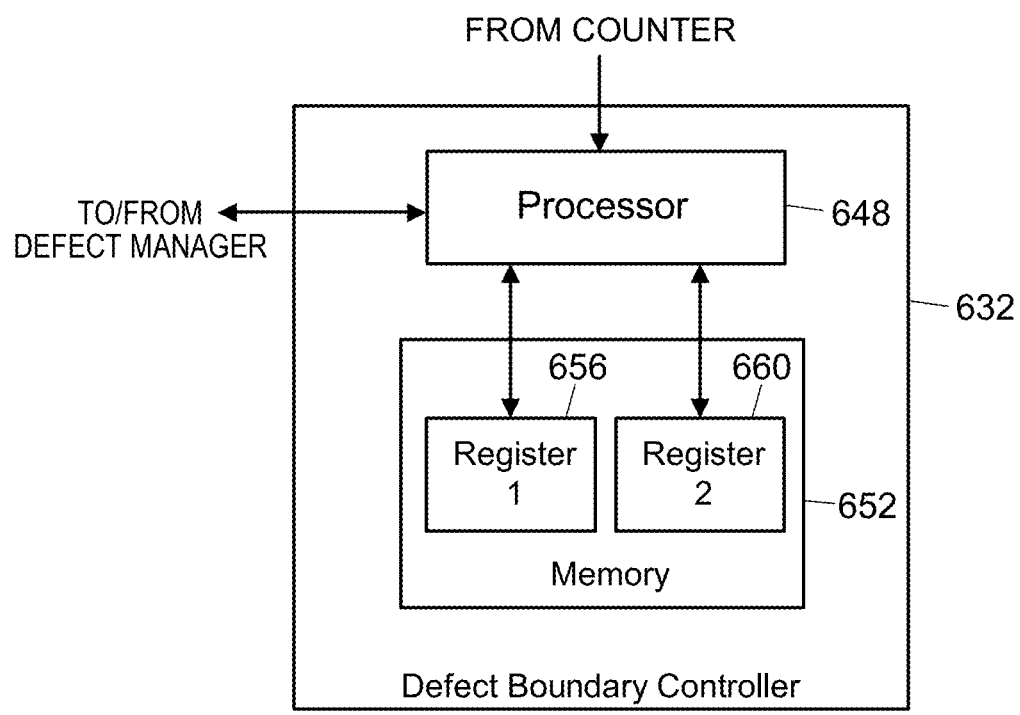
FIG. 6A illustrates a detailed view of a defect boundary controller of a defect management module, according to still another embodiment.
Figure 7:
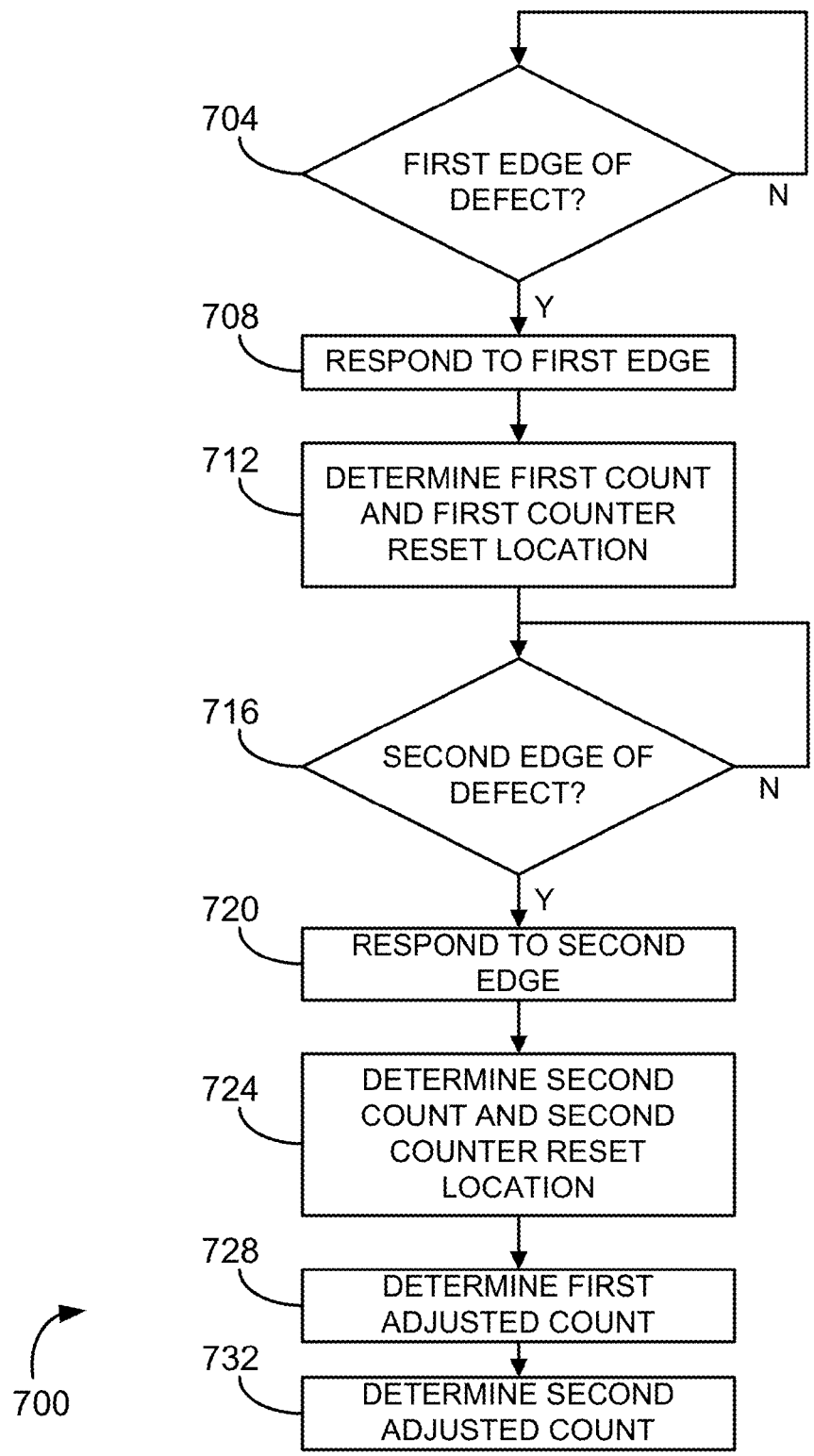
FIG. 7 is a flow chart of a method of determining a location of a defect on an optical storage medium of a disk drive system, according to yet another embodiment.

Further as to FIG. 6A, each time the counter 640 is reset and the resulting zero count is provided to the processor 648, the processor 648 may store an indication of the corresponding counter reset location in the memory 652, such as in the second register 660. In one embodiment, the processor 648 processes information regarding the resets of the counter 640 in conjunction with known information regarding the length of the track from which data is being read in order to determine the corresponding counter reset location. This storage of the indication of the counter reset location corresponding to each reset of the counter 640 may be either temporary or indefinitely. In one embodiment, however, when the processor 648 receives the defect detection signal from the defect manager 636, the processor 648 causes the indication of the counter reset location corresponding to the most recent reset of the counter 640 to be stored indefinitely. As will be recognized by one of ordinary skill in the art in light of the disclosure and teachings provided herein, this counter reset location is the first counter reset location 804.

After 712, at 716, it is determined whether a second edge of a defect, such as an end of the defect 108, has been detected on the optical storage medium 104. This determination may be made, for example, using settings provided by the disk controller 440 to the defect manager 636 or a defect detector (not shown) thereof, or using the servo controller 416, as discussed with respect to 704 above. If it is determined at 716 that the second edge of the defect 108 has been detected, the flow proceeds to 720. If the second edge of the defect 108 has not been detected, the flow remains at 716 until the second edge of the defect 108 is detected.

At 720, the defect manager 636 may respond to the second edge of the defect 108 by re-enabling the one or both of the controllers 432a and 432b and/or the servo controller 416 which were disabled at 708.

Next, at 724, a second count of the counter 640, and a second counter reset location, are determined. The first counter reset location 804 and the second counter reset location may be the same or different depending on the location of the defect 108 and the width of the defect 108. By way of example, in one or more embodiments wherein the first counter reset location 804 corresponds to a data boundary, a second data boundary, and thus a distinct second counter reset location such as the counter reset location 808, may occasionally be situated within the area of the optical storage medium 104 affected by the defect 108; that is, between the locations 816 and 820 at which the first and second edges of the defect 108 were detected, respectively. In this situation, after the first count of the counter 640 corresponding to the defect detection location is determined, the counter reset module 644 detects the second data boundary and resets the counter 640 before the second edge of the defect 108 is detected and the second count of the counter 640 is determined. If no data boundary or other counter reset location is situated between the locations 816 and 820, the first counter reset location 804 and the second counter reset location are the same. In one embodiment, where the second counter reset location differs from the first counter reset location 804 in the manner described above, the defect boundary controller 632 may further record the second counter reset location in the memory 652, such as in the second register 660.

The second count of the counter 640 indicates an amount of data, such as a number of data bits, stored on the optical storage medium 104 between the second counter reset location and the location at which the second edge of the defect 108 was detected. The second count of the counter 640 may be further recorded in the memory 652, such as in the first register 656.

Next, at 728, a first adjusted count is determined for use in a subsequent attempt to read data from the area of the optical storage medium 104 affected by the defect 108. More particularly, the first adjusted count corresponds to the predicted location of the first edge of the defect 108, shown as 824 in the second illustration of the track 800 in FIG. 8, or to a location having proximity to the predicted location of the first edge of the defect 108. As indicated in the depiction of the counter 640 below the location 824, the first adjusted count is slightly less than the first count. As shown in FIG. 8, the first adjusted count is the decimal number 399,985, whereas the first count as shown in FIG. 8 is 400,000. Thus, the first adjusted count can be used to determine when to change the response of the defect manager 636 during the subsequent attempt. In one embodiment, the defect boundary controller 632 may determine the first adjusted count by first determining a first count adjustment value to add to the first count of the counter 640 corresponding to the location at which the first edge of the defect 108 was detected. The sum of the first count adjustment value and the first count is the first adjusted count. The first count adjustment value represents an estimated number of channel clocks or bits between the location at which the first edge of the defect 108 was detected and the actual location of the first edge of the defect 108. The first count adjustment value may be, for example, on the order of 10 bits or 100 bits, and may vary depending on the type of optical storage medium 104 which is used. The first count adjustment value can be determined experimentally, for example, such that performance is optimized for certain common types of defects on the type of optical storage medium 104 which is used. In another embodiment, the defect boundary controller 632 may try different count adjustment values during an attempt to read data affected by the defect 108. For instance, the number of errors caused by the defect 108 can be, in some circumstances, more than what an error correction code can handle. By adjusting the count adjustment value as part of a re-read strategy, the defect boundary controller 632 may try different count adjustment values in an attempt to find a first count adjustment value that works well for the defect 108. This may be helpful when a default count adjustment value works well for some defects but not for other defects, such as the defect 108. Moreover, the first count adjustment value may be either negative or positive. In one embodiment, the first count adjustment value is negative such that the first adjusted count is lower than the first count of the counter 640.

With continued reference to 728, the first adjusted count may be stored in the memory 652 of the defect boundary controller 632, such as in the first register 656.

Next, at 732, a second adjusted count is determined for use in a subsequent attempt to read data from the area of the optical storage medium 104 affected by the defect 108. More particularly, the second adjusted count corresponds to the predicted location of the second edge of the defect 108, shown as 828 in the second illustration of the track 800 in FIG. 8, or to a location having proximity to the predicted location of the second edge of the defect 108. As indicated in the depiction of the counter 640 below the location 828, the second adjusted count is slightly less than the second count. As shown in FIG. 8, the second adjusted count is the decimal number 449,987, whereas the second count as shown in FIG. 8 is 450,000. Thus, the second adjusted count can be used to determine when to change the response of the defect manager 636 during the subsequent attempt. Similar to the determination of the first adjusted count as described with respect to 728, the defect boundary controller 632 may determine the second adjusted count by first determining a second count adjustment value to add to the second count of the counter 640 corresponding to the location at which the second edge of the defect 108 was detected. The sum of the second count adjustment value and the second count is the second adjusted count. The second count adjustment value represents an estimated number of channel clocks or bits between the location at which the second edge of the defect 108 was detected and the actual location of the second edge of the defect 108. As with the first count adjustment value described with respect to 728, the second count adjustment value may be, for example, on the order of 10 bits or 100 bits as determined in the manner described with respect to 728, and may vary depending on the type of optical storage medium 104 which is used. Additionally, the second count adjustment value may be either negative or positive. In one embodiment, the second count adjustment value is negative such that the second adjusted count is lower than the second count of the counter 640.

With continued reference to 732, the second adjusted count may be stored in the memory 652 of the defect boundary controller 632, such as in the first register 656.

Figure 9:
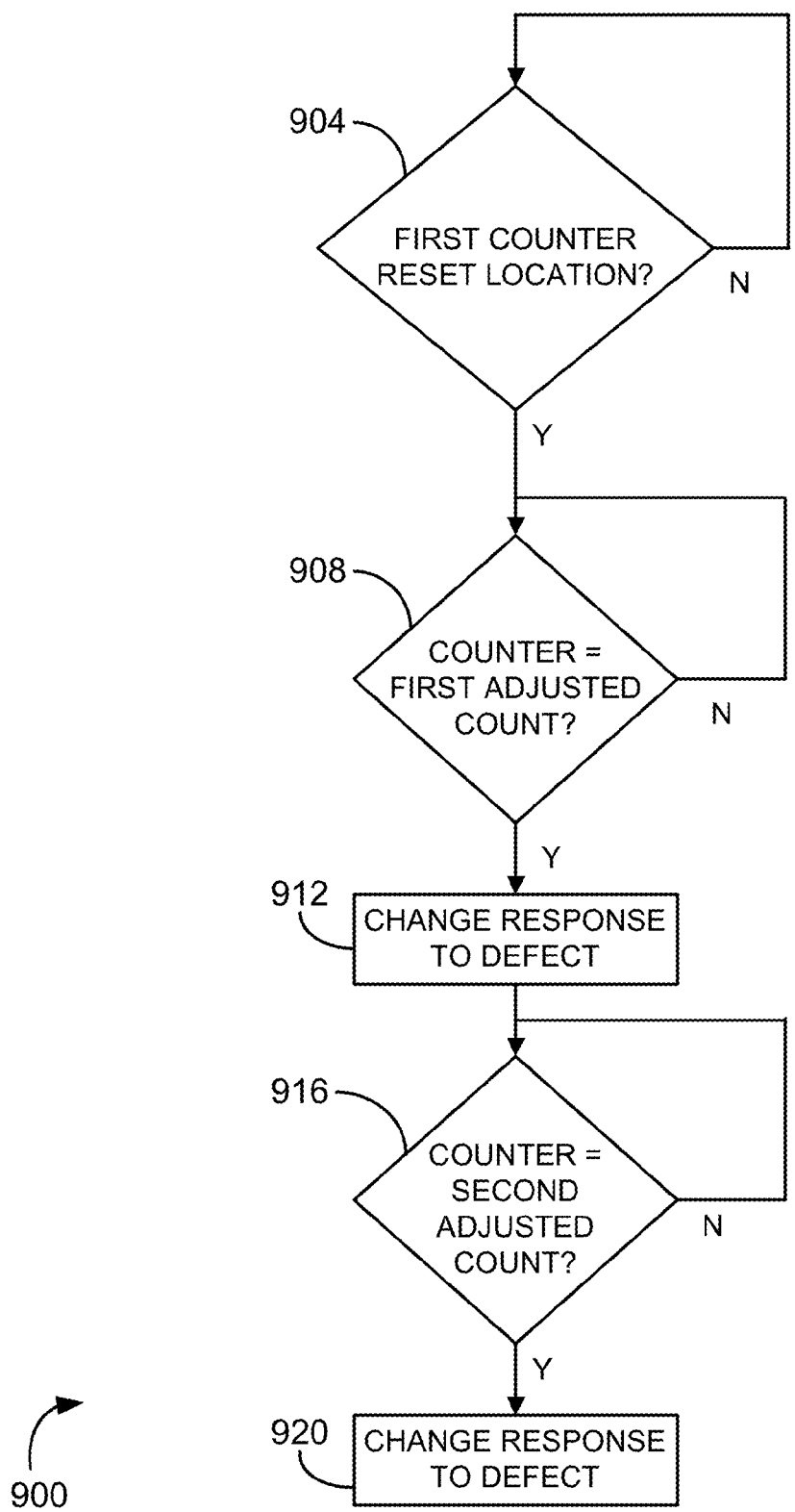
FIG. 9 is a flow chart of a method of changing a response to a defect on an optical storage medium of a disk drive system, according to another embodiment.

With reference now to FIG. 9, further operation of the disk drive system 600 will now be described in greater detail. FIG. 9 is a flow chart of a method 900 of changing a response to a defect on an optical storage medium of a disk drive system, according to one embodiment. The method 900 will be described with reference to the disk drive system 600 for ease of illustration. It will be understood, however, that the method 900 may be implemented by a system other than the disk drive system 600.

At 904, it is determined whether the first counter reset location 804 has been reached during a data read operation from the optical storage medium 104 subsequent to the data read operation which resulted in the detection of the defect 108. By way of example, and with reference back to FIG. 6A, the processor 648 of the defect boundary controller 632 may receive the counts of the counter 640 and thereby determine when the counter 640 is reset. As further discussed with respect to FIG. 6A, an indication of the first counter reset location 804 may be stored in the memory 652 of the defect boundary controller 632. By using the stored first counter reset location, and monitoring the counts of the counter in conjunction with known information regarding the length of the track from which data is being re-read, the processor 648 may determine whether the first counter reset location 804 has been reached. If it is determined that the first counter reset location 804 has been reached, the flow proceeds to 908. If the first counter reset location 804 has not been reached, the flow remains at 904 until the first counter reset location 804 has been reached.

At 908, it is determined whether a count of the counter 640 has reached the first adjusted count discussed above. For example, the processor 648 may receive the counts of the counter 640 and thereby determine when the count of the counter 640 has reached the first adjusted count. As discussed above, the first adjusted count may be stored in the memory 652 of the defect boundary controller and thus used by the processor 648 for comparison to the counts of the counter 640 received by the processor 648. As will be recognized by one of ordinary skill in the art in light of the disclosure and teachings provided herein, when the counter 640 reaches the first adjusted count, the OPU 408 is positioned at the predicted location of the first edge of the defect 108 or at a location having proximity to the predicted location of the first edge of the defect 108. If it is determined that the count of the counter 640 has reached the first adjusted count, the flow proceeds to 912. If the count of the counter 640 has not reached the first adjusted count, the flow remains at 908 until the count of the counter 640 has reached the first adjusted count.

At 912, a response of the defect management module 436 to the defect 108 is changed in view of the OPU 408 being positioned at the predicted location of the first edge of the defect 108 or at a location having proximity to the predicted location of the first edge of the defect 108. Thus, in the embodiment of FIG. 6, and as discussed with respect to FIGS. 4 and 5, the defect boundary controller 632 may cause the defect manager 636 to change its response to the defect 108 during a subsequent attempt to read data from an area of the optical storage medium 104 which is affected by the defect 108. In one embodiment, the defect boundary controller 632 may cause the defect manager 636 to change the response of one or both of the read channel controller 432 and/or the servo controller 416 instead of or in addition to changing its own response. As will be recognized by one of ordinary skill in the art in light of the disclosure and teachings provided herein, the defect boundary controller 632 thus determines when to change the response of the defect manager 636 and/or the read channel controller 432 and/or the servo controller 416 based on the first count of the counter 640 and based on the counter 640 itself; that is, the counts of the counter 640 which are generated during the subsequent attempt to read the data affected by the defect 108.

With continued reference to 912, the disk drive system 600 enables the defect manager 636, and/or a defect detector (not shown) included therein, and/or the read channel controller 432 and/or the servo controller 416 to change its response to the defect 108 during a subsequent attempt to read data from an area of the optical storage medium 104 which is affected by the defect 108 in any of a variety of ways, including ways such as those discussed with respect to FIGS. 4 and 5.

Continuing as to 912, in one embodiment, as discussed above, the defect boundary controller 632 can cause the defect manager 636 to generate a defect detection signal at the predicted location of the first edge of the defect 108. More specifically, the defect boundary controller 632 may cause the defect manager 636 to generate the defect detection signal. The defect manager 636 may appropriately generate the defect detection signal in order to choose an appropriate setting provided by the disk controller 440, as discussed with respect to FIGS. 4 and 5, for use to operate one or more of the servo controller 416, the offset and gain controller 432a, and the timing controller 432b to minimize the introduction of inaccurate data thereto. In this manner, the sensitivity of the defect manager 636 need not be increased and the danger of detecting false defects may be reduced. In one embodiment, the defect boundary controller 632 may also determine a different count adjustment value to determine a different adjusted count of the counter 640 which may be used by the defect boundary controller 632 to cause the defect manager 636 to change the operation of the servo controller 416 separately from that of the offset and gain controller 432a and the timing controller 432b.

With further reference to 912, and as discussed above, the defect boundary controller 632 may change a defect detection sensitivity of the defect manager 636. More particularly, in an embodiment wherein the defect manager 636 includes the defect detector (not shown), as discussed above, the defect boundary controller 632 may change a defect detection sensitivity of the defect detector. In certain applications using the optical storage medium 104 wherein predicting the actual location of the defect 108 with precision is more difficult, such as where the first edge of the defect 108 is relatively minor or not well-defined, it may be preferable to change the defect detection sensitivity of the defect manager 636, rather than cause the defect manager 636 to generate the defect detection signal when the counter 640 reaches the adjusted count. In this manner, the method 900 provides for more flexible detection of the defect 108.

Further as to 912, in yet another embodiment, as discussed above, the defect boundary controller 632 may change the response of the defect manager 636, and/or the response of the read channel controller 432, and/or the response of the servo controller 416, based on a determination that the defect 108 is of relatively minimal severity and that the data affected by the defect 108 may be successfully re-read by adjusting or maintaining the settings of one or more of the controllers 416, 432a, and 432b of the disk drive system 600. This determination may be based on the digital signal from the ADC 608 and/or the detected data from the data detector 612. The settings of the one or more of the controllers 416, 432a, and 432b may be adjusted in, for example, the manner discussed above with respect to the method 500. In this embodiment, the defect boundary controller 632 may, as in previous examples, determine that the OPU 408 is positioned at a location in proximity to the predicted location of the first edge of the defect 108 by determining when the counter 640 reaches the adjusted count after the counter reset module 644 has performed the reset of the counter 640 at the first counter reset location. Under the control of the defect boundary controller 632, the defect manager 636 may thereupon adjust the settings of one or more of the controllers 416, 432a, and 432b. In one embodiment, the defect detector (not shown) within the defect manager 636 may generate a suitable signal to adjust the settings of one or more of the controllers 416, 432a, and 432b.

Next, at 916, it is determined whether a count of the counter 640 has reached the second adjusted count discussed above. For example, the processor 648 may receive the counts of the counter 640 and thereby determine when the count of the counter 640 has reached the second adjusted count. As discussed above, the second adjusted count may be stored in the memory 652 of the defect boundary controller 632 and thus used by the processor 648 for comparison to the counts of the counter 640 received by the processor 648. As will be recognized by one of ordinary skill in the art in light of the disclosure and teachings provided herein, when the counter 640 reaches the second adjusted count, the OPU 408 is positioned at the predicted location of the second edge of the defect 108 or at a location having proximity to the predicted location of the second edge of the defect 108.

With further reference to 916 and with reference back to 724, the counter 640 may be reset at a second counter reset location which is different from the first counter reset location 804 discussed with respect to block 904. In this embodiment, the counter 640 begins counting from the different second counter reset location in order to reach the second adjusted count.

If it is determined at 916 that the count of the counter 640 has reached the second adjusted count, the flow proceeds to 920. If the count of the counter 640 has not reached the second adjusted count, the flow remains at 916 until the count of the counter 640 has reached the second adjusted count.

At 920, a response of the defect management module 436 to the defect 108 is changed in view of the OPU 408 being positioned at the predicted location of the second edge of the defect 108 or at a location having proximity to the predicted location of the second edge of the defect 108.

More specifically, the defect boundary controller 632 may cause the defect manager 636 to change its response to the defect 108 during a subsequent attempt to read data from an area of the optical storage medium 104 which is affected by the defect 108. In one embodiment, the defect boundary controller 632 may cause the defect manager 636 to change the response of one or both of the read channel controller 432 and/or the servo controller 416 instead of or in addition to changing its own response, such as by generating a suitable signal to re-enable any disabled controllers or by reducing a previously increased defect detection sensitivity, in order to return the disk drive system 600 to its normal mode of operation in the absence of the defect 108.

With reference now to both 912 and 920, the disk drive system 600 may further be used to improve later attempts to read the data affected by the defect 108, in addition to any immediate attempts to re-read the data. For example, the defect boundary controller 632 may store the first counter reset location 804, the first adjusted count, the second counter reset location, and the second adjusted count for a suitable length of time, or indefinitely, and change the response of the defect manager 636 and/or the read channel 620 and/or the servo controller 416 in the manner described above during a later attempt to read the data affected by the defect 108. In one embodiment, the defect boundary controller 632 may store the first counter reset location 804, the first adjusted count, the second counter reset location, and the second adjusted count for use in a later attempt to read the data if a predetermined number of attempts have already been made to re-read the data, and audio and/or video playback continuity requirements prohibit any additional attempts during the current playback session.

Figure 10:
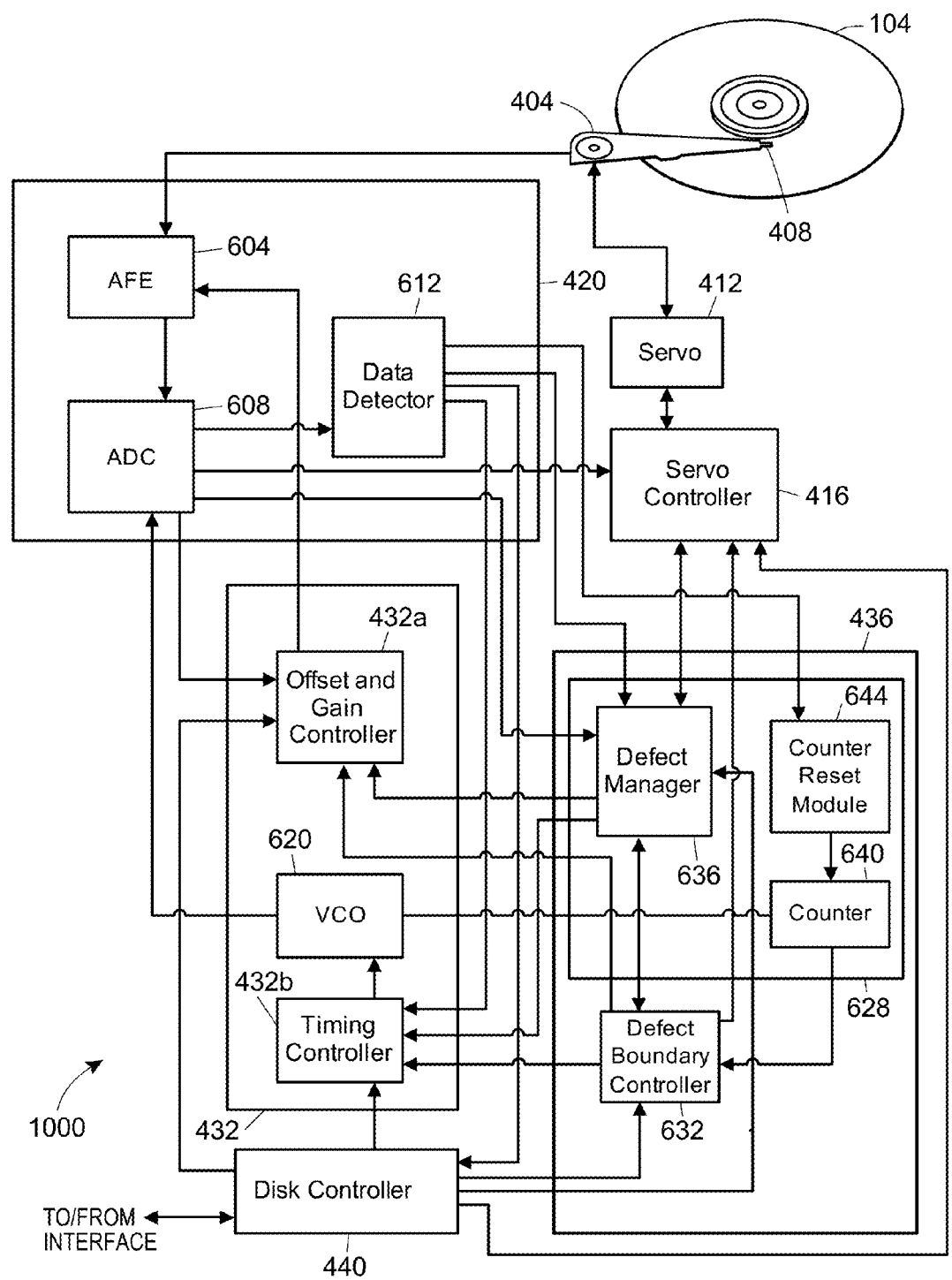
FIG. 10 is a block diagram of an alternative disk drive system including another implementation of a defect management module, according to another embodiment.

With continued reference to 912 and 920, in yet another alternative embodiment, as shown in the block diagram of the alternative disk drive system 1000 of FIG. 10, the defect boundary controller 632 may change its own response to the defect 108, instead of changing the response of the defect manager 636. For example, the defect boundary controller 632 may itself choose appropriate settings provided by the disk controller 440 for use to operate each of the servo controller 416, the offset and gain controller 432a, and the timing controller 432b in order to implement any one or more of the functionalities disclosed with respect to the method 500 for managing the detection of defects on the optical storage medium 104.

As further discussed above, a second location of the defect 108 on a second track may be predicted, such as by the defect boundary controller 632, by assuming that the defect 108 propagates radially across the optical storage medium 104 from the detected location of the defect 108 on the first track. In another embodiment, however, the defect boundary controller 632 may utilize information about the detected locations of the defect 108 on a plurality of tracks in order to accurately predict another location of the defect 108 on another track. For example, the defect boundary controller 632 may utilize information about the detected location of the defect 108 on the first track and a second detected location of the defect 108 on the second track to predict a third location of the defect 108 on a third track of the optical storage medium 104.

Figure 11:
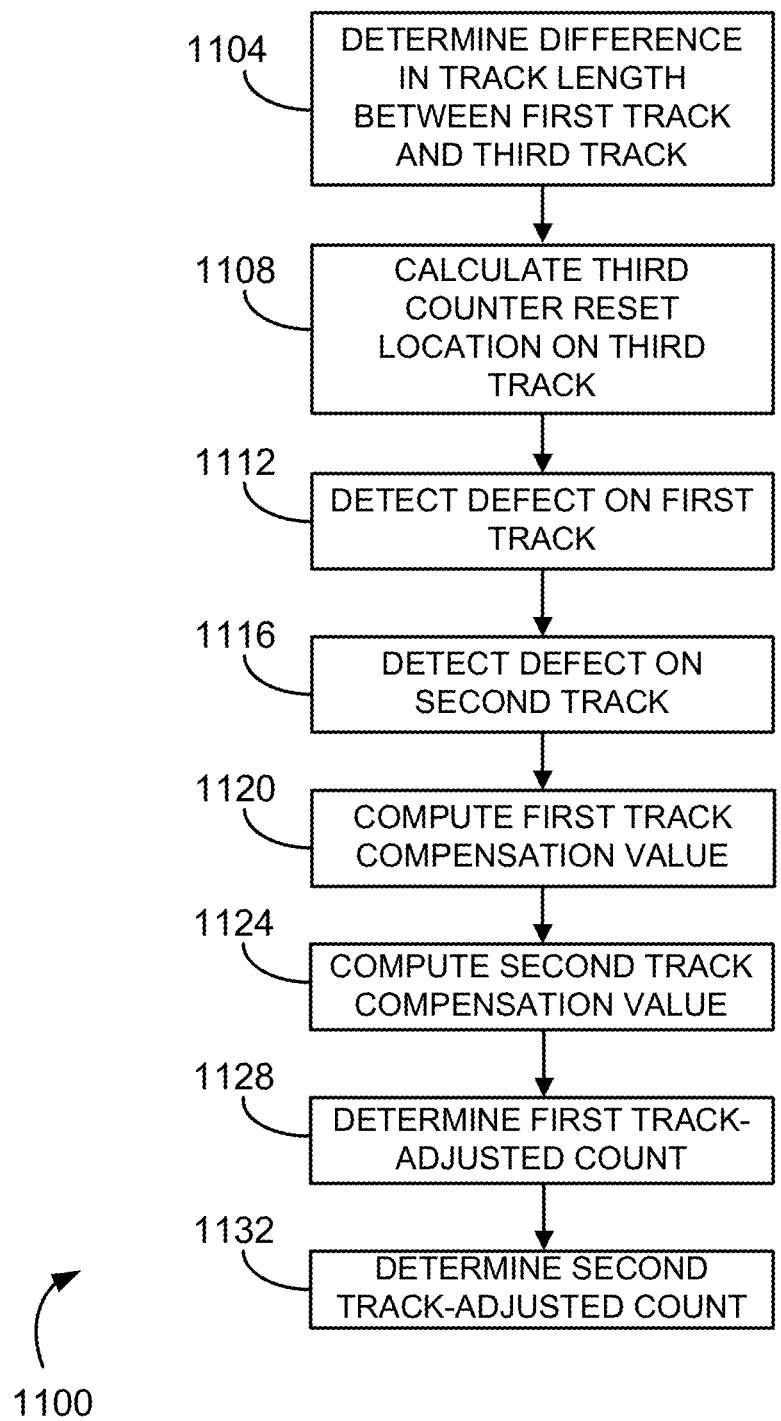
FIG. 11 is a flow chart of a method for predicting a location of a defect on a third track of an optical storage medium, according to still another embodiment.

FIG. 11 is a flow chart of a method 1100 which may be used, for example, to predict the third location of the defect 108 on the third track of the optical storage medium 104. The method 1100 will be described with reference to the disk drive system 600 for ease of illustration. It will be understood, however, that the method 1100 may be implemented by a system other than the disk drive system 600.

At 1104, a difference in track length between the first track and the third track is determined. For example, in the case of a circular optical storage medium 104, the difference in track length between two successive tracks may be expressed as:

$$2 \cdot \pi \cdot Tp \qquad \text{(Equ. 1)}$$

where Tp is the track pitch.

Figure 12:
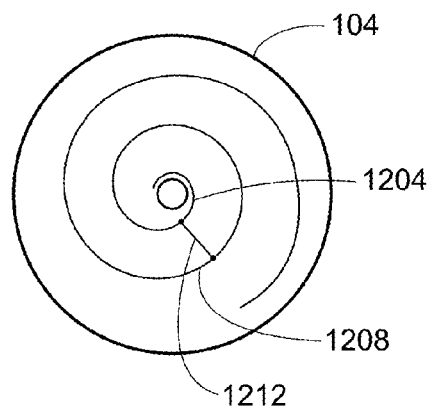
FIG. 12 illustrates an optical storage medium with a plurality of tracks, according to yet another embodiment.

With reference to FIG. 12, FIG. 12 illustrates the optical storage medium 104 with a plurality of tracks, including a first track 1204, which may be the first track discussed above, and a second track 1208. The length of the radial line 1212 is the track pitch. For example, on a DVD medium, the track pitch Tp is 0.74 μm, and the difference in track length between two successive tracks is, therefore:

$$2 \cdot \pi \cdot 0.74 \, \mu m = 4.65 \, \mu m.$$

With continued reference to 1104, a suitable multiple of the difference in track length between two successive tracks, depending on the number of tracks between the first track and the third track, is used to determine the difference in track length between the first track and the third track. The multiple will be two if the first track, the second track, and the third track are sequentially arranged on the optical storage medium 104.

Next, at 1108, a third counter reset location on the third track is calculated. The third counter reset location may not be at the same angular position on the optical storage medium 104 as is the first counter reset location 804. That is, the tracks on the optical storage medium 104 may be arranged in a spiral shape, such as is shown in FIG. 12. Thus, in an embodiment where each of the counter reset locations on the optical storage medium 104 is a location of a recognizable data boundary on the optical storage medium 104, as discussed above, this spiral arrangement and the increasing length of each spiral as the arrangement progresses toward the outer edge of the optical storage medium 104 may cause counter reset locations on different tracks to have different angular positions.

Figure 13:
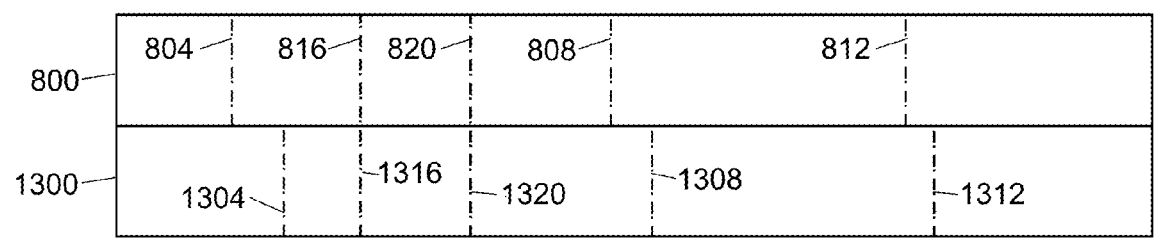
FIG. 13 illustrates counter reset locations and defect detection locations on two tracks of an optical storage medium, according to another embodiment.

For example, FIG. 13 illustrates the track 800 of FIG. 8 and a second track 1300. The track 800 and the second track 1300 may be, for example, the first and second tracks discussed above. The second track 1300 includes counter reset locations 1304, 1308, and 1312, and locations 1316 and 1320 at which the first and second edges, respectively, of the defect 108 were detected on the second track 1300. As may be seen from FIG. 13, while the locations 816 and 820 on the track 800 and the locations 1316 and 1320 on the second track 1300 may be aligned in the radial direction, the counter reset locations 804, 808, and 812 on the track 800 and the counter reset locations 1304, 1308, and 1312 on the second track 1300 may not be aligned in the radial direction.

With continued reference to 1108, the defect boundary controller 632 may utilize the difference in track length between the first track and the third track, as determined at 1104, to calculate the third counter reset location on the third track. The defect boundary controller 632 may calculate the third counter reset location on the third track based on: (i) the aforementioned first counter reset location 804 on the first track; (ii) a known length of the data blocks, such as ECC blocks, the boundaries of which are detected by the counter reset module 644 in order to reset the counter 640; and (iii) the difference in track length between the first track and the third track. Alternatively, in the embodiment wherein the first counter reset location is a predetermined angular position on the first track of the optical storage medium 104, the defect boundary controller 632 may perform a simpler calculation of the third counter reset location on the third track based on the counter reset location on the first track.

Next, at 1112, the defect 108 is detected on the first track. By way of example, the defect 108 may be detected, and the first counter reset location 804 and the first count may be determined and stored, as in the method 700. Similarly, the second counter reset location and the second count may be determined and stored as in the method 700.

Next, at 1116, the defect 108 is detected on the second track. As will be recognized by one of ordinary skill in the art in light of the disclosure and teachings provided herein, the first and second edges of the defect 108 on the second track, and the corresponding counter reset locations on the second track, may be determined in a manner similar to that described with respect to the method 700.

Next, at 1120, a first track compensation value is computed. The first track compensation value may be either negative or positive, and represents an estimated difference in the numbers of bits between: (i) the third counter reset location on the third track and an actual location of the first edge of the defect 108 on the third track; and (ii) the first counter reset location 804 on the first track and the location at which the first edge of the defect 108 was detected on the first track. Various techniques for computing the first track compensation value are described in detail below.

Next, at 1124, a second track compensation value is computed. The second track compensation value may be either negative or positive, and represents an estimated difference in the numbers of bits between: (i) the third counter reset location on the third track and an actual location of a second edge of the defect 108 on the third track; and (ii) the first counter reset location and the location at which the second edge of the defect 108 was detected on the first track.

With reference to 1120 and 1124, various techniques for computing the first and second track compensation values will now be described. In one embodiment, the read channel 420 may read data from the second track. The defect manager 636 may detect a first edge of the defect 108 on the second track in the same manner as such detection may occur with respect to the first track. The defect manager 636 may similarly detect a second edge of the defect 108 on the second track in the same manner as the defect manager 636 detected the location of the second edge of the defect 108 on the first track. The defect boundary controller 632 may then record a count of the counter 640 corresponding to the location at which the first edge of the defect 108 was detected on the second track, and may record a corresponding counter reset location. Additionally, the defect boundary controller 632 may record a count of the counter 640 corresponding to the location at which the second edge of the defect 108 was detected on the second track, and may record a corresponding counter reset location. The defect boundary controller 632 may thereupon compute the track compensation value and, if desired, the second track compensation value, as a function of variables including, but not limited to: (i) one or more of: the location at which the first edge of the defect 108 was detected on the first track, the location at which the second edge of the defect 108 was detected on the first track, the location at which the first edge of the defect 108 was detected on the second track, and the location at which the second edge of the defect 108 was detected on the second track, and (ii) the number of tracks between the first track and the third track.

With continued reference to 1120 and 1124, the defect boundary controller 632 may compute the first and second track compensation values based on an assumption that the defect 108 propagates radially, non-radially, or in a straight or curved manner. For example, the defect boundary controller 632 may assume that the defect 108 propagates non-radially, but still linearly, because the types of defects which are at issue when making predictions with respect to other tracks of the optical storage medium 104 are typically relatively long with respect to the track pitch. Thus, for example, the defect boundary controller 632 may assume that the defect 108 propagates linearly in a direction defined by the location at which the first edge of the defect 108 was detected on the first track and the location at which the first edge of the defect 108 was detected on the second track. The defect boundary controller 632 may construct the function used to compute the track compensation value and/or the second track compensation value accordingly, such as by using the number of tracks between the first track and the third track as a multiplier of the distance between the location at which the first edge of the defect 108 was detected on the first track and the location at which the first edge of the defect 108 was detected on the second track. In another embodiment, the defect boundary controller 632 may construct, for example, a polynomial function using the aforementioned variables to compute the track compensation value and/or the second track compensation value.

In another embodiment, the defect boundary controller 632 may construct the function used to determine the track compensation value and/or the second track compensation value by utilizing one or both of stored historical data and additional data, such as a detected location of the defect 108 on a fourth track of the optical storage medium 104, which fourth track need not be arranged in a sequential manner with respect to the first track, the second track, and the third track. For example, the defect boundary controller 632 may utilize such data to construct another linear function, or alternatively may utilize such data to construct a more complex but more precise function, such as a polynomial function, to determine the track compensation value. Moreover, as will be recognized by one of ordinary skill in the art in light of the disclosure and teachings provided herein, any suitable data may be utilized to construct any suitable function to compute the track compensation value for any particular track with a desired level of precision and complexity. Additionally, although the embodiments specifically described herein refer to computing track compensation values in connection with predicting the location of the defect 108 on the third track, one of ordinary skill in the art will recognize, in light of the disclosure and teaching provided herein, that the track compensation values may be computed as described herein and used in connection with predicting the location of the defect 108 on other tracks of the optical storage medium 104, such as the second track.

Next, at 1128, a first track-adjusted count is determined. The first track-adjusted count represents the estimated number of bits between the third counter reset location on the third track and the actual location of the first edge of the defect 108 on the third track. Thus, because the location at which the first edge of the defect 108 was detected on the first track corresponds to the first count of the counter 640 discussed above, the first track compensation value as disclosed with respect to 1120 may be added to the first count of the counter 640 to determine the first track-adjusted count.

Next, at 1132, a second track-adjusted count is determined. The second track-adjusted count represents the estimated number of bits between the third counter reset location on the third track and the actual location of the second edge of the defect 108 on the third track. Thus, because the location at which the second edge of the defect 108 was detected on the first track corresponds to the second count of the counter 640 discussed above, the second track compensation value as disclosed with respect to 1124 may be added to the second count of the counter 640 to determine the second track-adjusted count.

Once the first and second track-adjusted counts have been computed at 1130 and 1132, the defect boundary controller 632 may, during an attempt to read data from the area of the third track which is affected by the defect 108, change the response of the defect manager 636, and/or the response of the read channel 420, and/or the response of the servo controller 416, at or near the predicted third location of the defect 108 on the third track as indicated by the first and second track-adjusted counts. The response of the defect manager 636, and/or the response of the read channel 420, and/or the response of the servo controller 416 may be changed in a similar manner as discussed with respect to, for example, the method 500. For example, the defect boundary controller 632 may cause the defect manager 636 to generate a defect detection signal on the third track when the counter 640 reaches the first track-adjusted count after the counter 640 has been reset by the counter reset module 644 at the third counter reset location. As will be recognized by one of ordinary skill in the art in light of the disclosure and teachings provided herein, when the counter 640 reaches the first track-adjusted count, the OPU 408 is positioned at the predicted third location of the defect 108 on the third track.

In various other embodiments, when the counter 640 reaches the first track-adjusted count in this manner, the defect boundary controller 632 may instead change the defect detection sensitivity of the defect manager 636, control the defect manager 636 to cause an increase in the gain and/or dc offset applied by the offset and gain controller 432a, or change the response of the defect manager 636 to the defect 108 in any other suitable manner. In each embodiment, the defect boundary controller 632 may change the response of the defect manager 636 in the manner discussed above by causing the defect manager 636 to select from among appropriate settings provided to the controllers 416 and 432a and 432b by, for example, the disk controller 440 to operate the controllers 416 and 432a and 432b in order to implement any one or more of the aforementioned functionalities.

Alternatively, as discussed with respect to FIG. 10, the defect boundary controller 632 may change its own response to the defect 108, instead of changing the response of, for example, the defect manager 636. For example, the defect boundary controller 632 may itself choose appropriate settings provided by the disk controller 440 to use to operate each of the servo controller 416, the offset and gain controller 432a, and the timing controller 432b.

With respect to each of the methods 500, 700, 900, and 1100 described herein, it will be understood that numerous additional variations may be contemplated by one of ordinary skill in the art in light of the disclosure and teachings provided herein. In particular, the steps of any one or more of the foregoing methods may be implemented in any particular order, and one or more steps may be omitted as desired from any one or more of the foregoing methods. As just one example, the methods 500, 700, 900, and 1100 may not include one or more of the steps relating to detecting the second edge of the defect 108, determining the second adjusted count, determining the second track-adjusted count, and so on. For example, in such embodiments, the response of the defect manager 636, and/or the response of the read channel 420, and/or the response of the servo controller 416, may be returned to their states in the absence of the defect 108 after a predetermined period of time has elapsed.

The various blocks, operations, and techniques described above may be implemented in hardware, firmware, software, or any combination of hardware, firmware, and/or software. When implemented in software, the software may be stored in any computer readable memory such as a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. An apparatus, comprising:
a counter configured to generate counts associated with different locations, within a smallest addressable unit of data, on a storage medium of a disk drive;
a detector configured to detect a change in a property of a signal sensed from the storage medium; and
a controller configured to:
determine a count of the counter corresponding to a location, within a smallest addressable data unit on the storage medium, at which the change in the property of the signal sensed from the storage medium is detected, and
change a response of at least one of the detector, a read channel controller of the disk drive, or a servo controller of the disk drive based on (i) the count and (ii) the counter.

2. The apparatus of claim 1, further comprising a counter reset module configured to reset the counter at one or more counter reset locations;
wherein the controller is configured to:
determine a particular counter reset location corresponding to the location at which the change in the property of the signal is detected, and
change the response of the at least one of the detector, the read channel controller, or the servo controller further based on the counter reset location corresponding to the location at which the change in the property of the signal is detected.

3. The apparatus of claim 2, wherein the count indicates a number of periods of a channel clock of the storage medium between the counter reset location and the location at which the change in the property of the signal is detected.

4. The apparatus of claim 2, wherein the controller is configured to cause the read channel controller to enter a defect mode when, after the counter is reset at the counter reset location, the counter reaches an adjusted count corresponding to the location at which the change in the property of the signal is detected.

5. The apparatus of claim 2, wherein the controller is configured to change a detection sensitivity of the detector when, after the counter is reset at the counter reset location, the counter indicates proximity to the location at which the change in the property of the signal is detected.

6. The apparatus of claim 1, wherein the controller is configured to adjust the count at which the change in the property of the signal sensed from the storage medium is detected based on a delay in detecting the change in the property of the signal.

7. The apparatus of claim 6, wherein the controller is configured to determine an adjusted count based on the delay in detecting the change in the property of the signal, and change the response of at least one of the detector, the read channel controller of the disk drive, or the servo controller of the disk drive based on (i) the adjusted count and (ii) the counter.

8. The apparatus of claim 1, wherein:

the location at which the change in the property of the signal is detected is a first location on a track of the storage medium; and the controller is configured to determine an adjusted count based on a prediction of a second location on the storage medium of a feature on the storage medium that causes the change in the property of the signal sensed from the storage medium, and change the response of at least one of the detector, the read channel controller of the disk drive, or the servo controller of the disk drive based on (i) the adjusted count and (ii) the counter, wherein, relative to the first location on the storage medium, the second location on the storage medium is closer to an actual location of the feature on the storage medium that causes the change in the property of the signal sensed from the storage medium.

9. The apparatus of claim 1, wherein the controller is configured to:

compute a compensation value based on the location at which the change in the property of the signal is detected, wherein the location at which the change in the property of the signal is detected is a first location on a first track of the storage medium; and add the compensation value to the count corresponding to the first location to predict a second location of a feature on a second track of the storage medium.

10. A method, comprising:

running a counter, wherein counts of the counter are associated with different locations, within a smallest addressable unit of data, on a storage medium of a disk drive;

detecting, with a detector device, a change in a property of a signal sensed from the storage medium;

determining, with a controller device, a count of the counter corresponding to a location at which the change in the property of the signal sensed from the storage medium is detected; and changing, with the controller, a response of at least one of the detector device, a read channel controller device of the disk drive, or a servo controller device of the disk drive based on (i) the count and (ii) the counter.

11. The method of claim 10, further comprising:

resetting, with the controller device, the counter at one or more counter reset locations;

determining, with the controller device, a counter reset location corresponding to the location at which the change in the property of the signal sensed from the storage medium is detected;

wherein changing the response of the at least one of the detector device, the read channel controller device, or the servo controller device is further based on the counter reset location corresponding to the defect.

12. The method of claim 11, wherein the count indicates a number of periods of a channel clock of the storage medium occurring between the counter reset location corresponding to the location at which the change in the property of the signal sensed from the storage medium is detected and the defect location.

13. The method of claim 11, wherein the counter reset location corresponding to the location at which the change in the property of the signal sensed from the storage medium is detected is a boundary of an error correction coding block on the storage medium.

14. The method of claim 11, wherein the counter reset location corresponding to the location at which the change in the property of the signal sensed from the storage medium is detected is a boundary of a data sector on the storage medium.

15. The method of claim 11, wherein the counter reset location corresponding to the location at which the change in the property of the signal sensed from the storage medium is detected is a predetermined angular position on the storage medium.

16. The method of claim 10, wherein changing the response of the detector device comprises changing a defect detection sensitivity of the detector device when, after the counter is reset at the counter reset location, the counter indicates proximity to the location at which the change in the property of the signal sensed from the storage medium is detected.

17. The method of claim 10, wherein changing the response of the read channel controller device comprises causing the read channel controller device to enter a defect mode when, after the counter is reset at the counter reset location, the counter reaches an adjusted count corresponding to the location at which the change in the property of the signal sensed from the storage medium is detected.

18. The method of claim 10, further comprising adjusting, with the controller device, the count at which the change in the property of the signal sensed from the storage medium is detected based on a delay in detecting the change in the property of the signal.

19. The method of claim 18, further comprising:

determining, with the controller device, an adjusted count based on the delay in detecting the change in the property of the signal; and changing, with the controller device, the response of at least one of the detector, the read channel controller of the disk drive, or the servo controller of the disk drive based on (i) the adjusted count and (ii) the counter.

20. The method of claim 10, wherein:

the location at which the change in the property of the signal is detected is a first location on a track of the storage medium; and the method further comprises:

determining, with the controller device, an adjusted count based on a prediction of a second location on the storage medium of a feature on the storage medium that causes the change in the property of the signal sensed from the storage medium; and changing, with the controller device, the response of at least one of the detector device, the read channel controller device, or the servo controller device based on (i) the adjusted count and (ii) the counter, wherein, relative to the first location on the storage medium, the second location on the storage medium is closer to an actual location of the feature on the storage medium that causes the change in the property of the signal sensed from the storage medium.

21. The method of claim 10, further comprising:

computing, at the controller device, a compensation value based on the location at which the change in the property of the signal is detected, wherein the location at which the change in the property of the signal is detected is a first location on a first track of the storage medium; and adding, at the controller device, the compensation value to the count corresponding to the first location to predict a second location of a feature on a second track of the storage medium.

* * * * *